US009815961B2

(12) United States Patent
Yang et al.

(10) Patent No.: US 9,815,961 B2
(45) Date of Patent: *Nov. 14, 2017

(54) ENVIRONMENTALLY FRIENDLY COLORANT COMPOSITIONS AND LATEX PAINTS/COATINGS

(71) Applicant: Columbia Insurance Company, Omaha, NE (US)

(72) Inventors: Yong Yang, Hillsborough, NJ (US); Mohammed Asif, Middletown, NJ (US); Robert J. Sheerin, North Caldwell, NJ (US)

(73) Assignee: Columbia Insurance Company, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/844,510

(22) Filed: Sep. 3, 2015

(65) Prior Publication Data

US 2015/0376367 A1 Dec. 31, 2015

Related U.S. Application Data

(63) Continuation of application No. 12/718,105, filed on Mar. 5, 2010, now Pat. No. 9,139,676, which is a continuation-in-part of application No. 11/319,840, filed on Dec. 28, 2005, now Pat. No. 7,750,074, which is a continuation-in-part of application No. 10/728,599, filed on Dec. 4, 2003, now Pat. No. 7,402,627.

(60) Provisional application No. 61/258,963, filed on Nov. 6, 2009, provisional application No. 60/496,366, filed on Aug. 18, 2003.

(51) Int. Cl.

| | | |
|---|---|---|
| *C09D 133/10* | (2006.01) | |
| *C08K 3/22* | (2006.01) | |
| *C08F 218/08* | (2006.01) | |
| *C08F 220/06* | (2006.01) | |
| *C09D 17/00* | (2006.01) | |
| *C09D 5/02* | (2006.01) | |
| *C08F 220/18* | (2006.01) | |
| *C08F 220/30* | (2006.01) | |
| *C08K 3/00* | (2006.01) | |
| *C08K 5/00* | (2006.01) | |
| *C08L 33/02* | (2006.01) | |
| *C08L 33/14* | (2006.01) | |

(52) U.S. Cl.
CPC ............ *C08K 3/22* (2013.01); *C08F 218/08* (2013.01); *C08F 220/06* (2013.01); *C09D 5/027* (2013.01); *C09D 17/001* (2013.01); *C09D 133/10* (2013.01); *C08F 220/18* (2013.01); *C08F 220/30* (2013.01); *C08K 3/0033* (2013.01); *C08K 5/0041* (2013.01); *C08K 2003/2272* (2013.01); *C08L 33/02* (2013.01); *C08L 33/14* (2013.01)

(58) Field of Classification Search
CPC .... C08F 218/08; C08F 220/06; C08F 220/18; C08F 220/30; C08F 2220/286; C08F 2220/1808; C08F 222/1006; C08K 5/0041; C08K 3/0033; C08K 2003/2272; C08K 3/22; C08L 33/02; C08L 33/14; C09D 133/10; C09D 17/001; C09D 5/027
See application file for complete search history.

(56) References Cited

U.S. PATENT DOCUMENTS

| | | |
|---|---|---|
| 3,769,247 A | 10/1973 | Glomski et al. |
| 4,138,381 A | 2/1979 | Chang et al. |
| 4,348,294 A | 9/1982 | King |
| 4,384,096 A | 5/1983 | Sonnabend |
| 4,421,902 A | 12/1983 | Chang et al. |
| 4,423,199 A | 12/1983 | Chang et al. |
| 4,425,466 A | 1/1984 | Santer et al. |
| 4,429,097 A | 1/1984 | Chang et al. |
| 4,432,881 A | 2/1984 | Evani |
| 4,529,773 A | 7/1985 | Witiak et al. |
| 4,569,965 A | 2/1986 | Engel et al. |
| 4,600,761 A | 7/1986 | Ruffner et al. |
| 4,616,074 A | 10/1986 | Ruffner |
| 4,892,916 A | 1/1990 | Hawe et al. |
| 5,096,733 A | 3/1992 | Vallyathan et al. |
| 5,527,614 A | 6/1996 | Carpenter et al. |
| 5,576,384 A | 11/1996 | Nolken et al. |
| 5,770,760 A * | 6/1998 | Robinson ................ C07C 69/54 560/198 |
| 5,874,495 A | 2/1999 | Robinson |
| 6,221,145 B1 * | 4/2001 | McClain ................ C09D 5/024 106/436 |
| 6,248,805 B1 | 6/2001 | Nguyen et al. |
| 6,337,366 B1 | 1/2002 | Amick et al. |
| 6,355,727 B1 | 3/2002 | Andrist et al. |
| 6,602,948 B2 | 8/2003 | Harris et al. |
| 6,762,269 B1 | 7/2004 | Maxim, Jr. et al. |

(Continued)

*Primary Examiner* — Satya Sastri
(74) *Attorney, Agent, or Firm* — The H.T. Than Law Group

(57) ABSTRACT

The invention relates to colorant compositions, and aqueous latex paints or other water-borne coatings made from them, which have a mitigated environmental impact. Levels of solvents, additives and impurities comprising volatile non-aqueous constituents, alkylphenol ethoxylates (and derivatives thereof), crystalline silica, and/or formaldehyde are decreased relative to those typical of preceding generations of colorants and tinted aqueous latex paints and other water-borne coatings. On the other hand, paint-performance as indicated by any of Stormer viscosity stabilization, rheological profile flow/leveling and sag resistance, water sensitivity and color transfer resistance is comparable to a paint in which the aforementioned solvents, additives and impurities are still present.

18 Claims, No Drawings

(56) References Cited

U.S. PATENT DOCUMENTS

| | | |
|---|---|---|
| 6,812,278 B2 | 11/2004 | Harris et al. |
| 6,887,928 B2 | 5/2005 | Tanzer et al. |
| 7,217,443 B2 | 5/2007 | Bobsein et al. |
| 7,402,627 B2 * | 7/2008 | Yang .................. B01F 17/0028 106/493 |
| 7,750,074 B2 * | 7/2010 | Yang .................. B01F 17/0028 524/522 |
| 9,139,676 B2 * | 9/2015 | Yang ..................... C08F 218/08 |
| 2002/0013401 A1 * | 1/2002 | Friel .................. B01F 13/1055 524/501 |
| 2002/0165313 A1 * | 11/2002 | Tanzer ............... C09B 67/0063 524/589 |
| 2003/0176569 A1 | 9/2003 | Tanzer et al. |
| 2004/0157956 A1 * | 8/2004 | Vincent .................. C09D 11/32 523/160 |
| 2005/0020763 A1 | 1/2005 | Milic |
| 2005/0039635 A1 | 2/2005 | Yang et al. |
| 2005/0134665 A1 | 6/2005 | Wang et al. |
| 2006/0167172 A1 | 7/2006 | Yang et al. |
| 2006/0207476 A1 | 9/2006 | Coward et al. |
| 2007/0155880 A1 | 7/2007 | Bobsein et al. |
| 2009/0149591 A1 | 6/2009 | Yang et al. |

* cited by examiner

ENVIRONMENTALLY FRIENDLY COLORANT COMPOSITIONS AND LATEX PAINTS/COATINGS

The present application is a continuation and claims the benefit of priority under 35 U.S.C. §120 of U.S. Ser. No. 12/718,105 entitled "Environmentally Friendly Colorant Composition and Latex Paints/Coatings," filed on Mar. 5, 2010, which is a continuation-in-part of and claims the benefit of priority under 35 U.S.C. §120 of U.S. application Ser. No. 11/319,840, entitled "Copolymer Surfactants" filed Dec. 28, 2005 and issued as U.S. Pat. No. 7,750,074 on Jul. 6, 2010, which is a continuation-in-part of U.S. application Ser. No. 10/728,599, entitled "Precursor Colorant Composition for Latex Paint" filed Dec. 4, 2003 and issued as U.S. Pat. No. 7,402,627 on Jul. 22, 2008.

The present application also claims priority under 35 U.S.C. §119(e) to the U.S. provisional application No. 61/258,963 filed on Nov. 6, 2009. The grand-parent application Ser. No. 10/728,599 claims priority under 35 U.S.C. §119(e) to U.S. provisional application No. 60/496,366, entitled "Copolymer Surfactants" filed Aug. 18, 2003. All priority patent applications are incorporated herein by reference in their entireties.

FIELD OF THE INVENTION

The invention relates to colorant compositions, and aqueous latex paints or other water-borne coatings made from them, which have a mitigated environmental impact.

BACKGROUND OF THE INVENTION

There is increasing societal sensitivity to environmental issues, including minimization of solvent and impurity levels for the purposes of eliminating health concerns, preserving the integrity of the earth's resources, and the like. In that connection, there have been substantial efforts not only in the public sector, but also the private sector, to institute improved environmental practices. This has included the introduction of voluntary and sometimes mandatory standards by which the environmental friendliness of products and services in the marketplace can be judged (see Green Seal Environmental Leadership Standard for Paint GS-11). Products and services which meet such standards, and the commitment to furnishing same, are often referred to as "green". Indeed, it is considered very valuable to be qualified to apply the designation "green" (or some equivalent) to products and services in commerce.

One area in which the foregoing has become important is construction and renovation products, and especially aqueous latex paints and other water-borne coatings. There are governmental regulations for mandating the environmental friendliness of such paints and other coatings, but typically non-governmental third-party standards are even more rigorous. Examples of the latter standards are LEED, GREENGARD, GREENGARD Children and Schools, MPI Green Performance, Green Seal, and Collaborative for High Performance Schools. Pursuant to standards such as these, levels of solvents and impurities such as volatile non-aqueous constituents (sometimes referred to in this specification as "VNCs"), alkylphenol ethoxylates (sometimes referred to in this specification as "APES"), crystalline silica, and formaldehyde are controlled.

However, simply minimizing the amount of environmentally undesirable substances in paints and other coatings is recognized to be insufficient. Instead, the "greening" of paints and other coatings would preferably be achieved without undue loss of performance in providing protection for surfaces which they are utilized to cover. For instance, the MPI Green Performance standard "therefore requires that all products shall meet or exceed the performance requirements of the applicable MPI product standard." The point is that "greening" should, to the extent possible, not entail sacrificing properties which are conventionally taken as characterizing proper paint performance.

Achieving the dual objectives of "greening" paints and other coatings while maintaining good performance is a challenging proposition. We have seen that formulating aqueous latex paints and other water-borne coatings in accordance with "green" principles commonly leads to degradation of at least one important property, and often more than one, in the paint or other coating in question. More specifically, in our experience paint/coating performance can be characterized by: Stormer viscosity stability; rheological profile; flow/leveling and sag resistance; water sensitivity; and color transfer resistance. When an aqueous latex paint or other water-borne coating is "greened" by minimization of solvent, additive or impurity content such as VNCs, APEs or derivatives, crystalline silica and formaldehyde, it is clearly difficult to prevent the diminution of one or more of those properties.

Further complication arises when aqueous latex paints or other water-borne coatings are tinted. The tinting process is often carried out by means of adding one or more colorant compositions at the point of sale to a pre-formulated base composition. This is a popular and advantageous way of marketing tinted paints or other coatings, especially tinted aqueous latex paints. However, unlike pre-formulated aqueous latex paints and other water-borne coatings, colorant compositions are not generally included within the scope of materials governed by "green" standards (at least non-governmental third-party standards). By way of example, see the MPI Green Performance standard relating to VOLATILE ORGANIC COMPOUND (VOC) REQUIREMENTS, wherein it is prescribed that the "calculation of VOC shall exclude water and tinting color added at the point of sale", as well as the GS-11 standard wherein it is stated "Low- or zero-VOC paints have experienced increased sales, but many shoppers are not aware that VOC levels may increase with the addition of colorants to the base paint." It follows that addition of colorant compositions which are not conformed to "green" standards can lead to a "back door" introduction of environmentally undesirable solvents, additives and impurities that undercuts any advantage otherwise gained by "greening" the pre-formulated base compositions. Accordingly, it would be a substantial advance if there were provided aqueous latex paints and other water-borne coatings which qualify for the designation "green" but retain their high performance characteristics, and at the threshold a colorant composition capable of yielding such paints and other coatings.

SUMMARY OF THE INVENTION

In view of the foregoing, it is an object of the invention to provide a colorant composition capable of yielding an aqueous latex paint or other water-borne coating with mitigated environmental impact, and (correspondingly) a paint or other coating which exhibits such mitigated impact.

It is another object of the invention to provide a colorant composition capable of yielding an aqueous latex paint or other water-borne coating with mitigated environmental impact as a result of decreased amounts of solvents, additives or impurities such as VNCs, APEs and derivatives thereof, crystalline silica and formaldehyde, and correspondingly an aqueous latex paint or other water-borne coating having decreased amounts of those solvents, additives or impurities.

It is an additional object of the invention to provide a colorant composition and paint or other coating as aforesaid, which further enable the achievement of performance comparable to paints or coatings in which the levels of VNCs, APEs and derivatives, crystalline silica and formaldehyde have not been lowered for environmental advantage.

It is yet another object of the invention to provide a colorant composition and paint or other coating as aforesaid in which Stormer low-shear viscosity stability, rheological profile, flow/leveling and sag resistance, water sensitivity, and color transfer resistance are comparable to those properties as exhibited by aqueous latex paints or other water-borne coatings unmodified to address environmental concerns.

And, it is still another object of the invention to provide methods of making such colorant compositions and paints or other coatings.

These and other objects are attained through practice of the invention as follows:

In one aspect, the invention is in a colorant composition suitable as a precursor to an aqueous latex paint or other water-borne coating, which colorant composition comprises at least one pigment, water, and a copolymer surfactant, which colorant composition is not itself an aqueous latex paint or other water-borne coating. The copolymer surfactant comprises moieties corresponding to the following monomers (a) from about 10% to about 80% by weight of at least one $C_3$-$C_{12}$ α,β-ethylenically unsaturated carboxylic acid or anhydride, (b) from about 10% to about 80% by weight of at least one $C_3$-$C_{12}$ α,β-ethylenically unsaturated vinyl monomer, and (c) from about 0.01% to about 20% by weight of at least one surfactant monomer, wherein each said surfactant monomer is either an acrylic or methacrylic ester moiety joined with a hydrophobic moiety by a bridging group comprising a poly(ethyleneoxy) moiety. The colorant composition is substantially free of, collectively: any volatile non-aqueous constituents; any alkylphenol ethoxylates or derivatives thereof; any crystalline silica; and any formaldehyde. Nevertheless, the colorant composition is capable of (i) mitigating any change in the Stormer low-shear viscosity of an aqueous latex paint or other water-borne coating formed of a mixture comprising said composition and a tint base, such that said Stormer low-shear viscosity of said paint is not substantially changed compared with the Stormer low-shear viscosity of the tint base, and (ii) yielding such paint or other coating which also exhibits flow/leveling and sag of at least 8, water sensitivity of at least 3, and color transfer of at least 3.

In another aspect, the invention is in an aqueous latex paint or other water-borne coating which comprises a mixture of a tint base and colorant composition containing at least one pigment, water and a copolymer surfactant comprising moieties corresponding to the following monomers:

(a) from about 10% to about 80% by weight of at least one $C_3$-$C_{12}$ α,β-ethylenically unsaturated carboxylic acid or anhydride, (b) from about 10% to about 80% by weight of at least one $C_2$-$C_{12}$ α,β-ethylenically unsaturated vinyl monomer, and (c) from about 0.01% to about 20% by weight of at least one surfactant monomer, wherein each said surfactant monomer is either an acrylic or methacrylic ester moiety joined with a hydrophobic moiety by a bridging group comprising a poly(ethyleneoxy) moiety. The paint or other coating is substantially free oft collectively: any volatile non-aqueous constituents; any alkylphenol ethoxylates or derivatives thereof; any crystalline silica; and any formaldehyde. Despite that, (i) the Stormer low-shear viscosity of said paint, its formation by mixing of the colorant composition with the tint base notwithstanding, is not substantially changed compared with the Stormer low-shear viscosity of the tint base, (ii) flow/leveling and sag are at least 8, (iii) water sensitivity is at least 3, and (iv) color transfer is at least 3.

In a further aspect, the invention is in a method of making a colorant composition suitable as a precursor to an aqueous latex paint or other water-borne coating, which comprises combining the components water, at least one pigment, and an aforementioned copolymer surfactant, wherein the amount of any VNCs. APEs or derivatives thereof, crystalline silica and formaldehyde incident to the incorporation of such components is as disclosed previously for the colorant composition of our invention.

In an additional aspect, the invention is in a method of making an aqueous latex paint or other water-borne coating, which comprises combining a tint base as disclosed above and a colorant composition as disclosed above, such that the amount in the paint or other coating of any VNCs, APEs or derivatives thereof, crystalline silica is as disclosed previously herein for the paint or other coating of our invention.

Practice of the invention confers substantial advantages. More specifically, with the invention not only are VNCs reduced to an exceedingly low level or effectively eliminated, but also such reduction or elimination is also true in respect of APEs and derivatives thereof, crystalline silica and formaldehyde (these are sometimes referred to in this specification as "target substances"). As a consequence, the aqueous latex paint or other water-borne coating produced in accordance with the invention meets the requirements of numerous different government and industry standards for environmental friendliness. This is significant because it can lead to an entitlement to designate paints of the invention as "green" and/or free of various undesirable materials, in accordance with various standards referred to in the preceeding "Background" section, as well as in accordance with the EPA's definition of Hazardous Air Pollutants ("HAPS"), as constituted as of the filing date of this disclosure. Furthermore, there has not to our knowledge been a colorant composition prior to the invention produced in such manner that any amounts of solvents, additives and/or impurities which interfere with environmentally responsible paint formulation, i.e., VNCs, APEs or derivatives thereof, crystalline silica, and formaldehyde, are held at an acceptably low level. With the invention, the customary carry-through effect on a product paint or coating of such solvents, additives and impurities in a colorant composition from which the paint or other coating is made can be lessened or completely removed as a factor, because the colorant composition of the invention itself meets (or at least is such that a paint or other coating formulated with it meets) the aforementioned standards, and thus it also can often be designated "green" or free of various undesirable materials in accordance with those standards and/or HAPS (as constituted as of the filing date of this disclosure). However—and this is integral to our invention—the mitigation of environmentally undesirable effects is not accompanied by an appreciable Pall-off of any of the good performance characteristics already identified by us, namely: Stormer low-shear viscosity stability; rheological profile, flow/leveling and sag resistance; water sensitivity; and color transfer resistance. Rather, a strong performance contour is maintained in respect of those properties collectively. This means that improvement on the environmental front is achieved without materially degrading performance as to any of the key properties discussed previously, which is contrary to what our experience suggested and therefore would have been unexpected by practitioners in the field at the time of our invention.

At the threshold, it is important for an understanding of the invention to recognize differences between and among three fundamental and distinct concepts in the technological area of interest namely, aqueous latex paints and other water-borne coatings, colorant compositions which are utilized to tint such paints and coatings, and tint bases with which the colorant compositions are combined in formulating such paints and coatings. Thus, an aqueous latex paint or other water-borne coating is typically air-dried and ordinarily comprises water, a film-forming polymeric binder in sufficient amount to form a paint film or coating upon drying, one or more pigments, and various additives such as associative thickeners. In contrast, a colorant composition is not a paint or other coating as aforesaid, but rather a water-based and typically concentrated dispersion of a relatively large volume of pigment in a relatively small volume of water; other components are generally also be present, in particular one or more surfactants to facilitate dispersion of the pigment content. Unlike such paint or other coating, a colorant composition does not contain an amount of film-forming polymeric binder sufficient to form a film upon drying. And, a tint base is neither a paint/coating nor a colorant composition, but rather a precursor component of a paint/coating which contains water, a film-forming polymeric binder in sufficient amount to provide a film upon drying of a paint/coating made with such tint base, and white or pastel pigmentation to furnish an essentially neutral foundation for tinting with a colorant composition. The tint base contributes to the hiding power of a paint, but does not contain pigment suitable to serve as the tinting agent for a final paint or coating, and is neither a paint/coating nor colorant composition. For purposes of the instant presentation, the terms "aqueous latex paint", "water-borne coating", "colorant composition", and "tint base" shall be interpreted in accordance with the meanings indicated in the preceding sentences of this paragraph and the other portions of this specification as appropriate.

As used in this specification, a "polymer" is a compound comprising one or more different component units, each such component unit being a moiety corresponding to a particular monomer. A "copolymer" is a polymer comprising at least two different component units, each of which units corresponds to (and is derived from) a different monomer. Thus, a copolymer comprising component units corresponding to three different monomers (also known as a terpolymer) is included within the term "polymer," as is a polymer comprising one component unit (also known as a homopolymer).

Similarly, in this specification, "VNC" or "volatile nonaqueous constituent" means substances other than water which are released into the environment from a colorant composition, or a paint or coating, under conditions to which such composition, paint or coating is normally exposed. The terms encompass both organic (for instance, volatile organic compounds or "VOCs") and inorganic substances, and decomposition or other reaction products of precursor materials in the composition, paint or coating. It is noted that APEs and their derivatives are often categorized separately from VOCs and that distinction is observed herein, VNCs being deemed not to include APEs or derivatives thereof.

Further, in this specification, "substantially free" means (a) in respect of a colorant composition, an amount no greater than about 0.3 weight % and (b) in respect of an aqueous latex paint or other water-borne coating, or a tint base, an amount no greater than about 0.15 weight %. Furthermore, in this specification the term "substantially entirely free" means an amount no greater than 0.0005 weight %.

The disclosure of each of U.S. Provisional Application No. 60/496,366, filed Aug. 18, 2003, U.S. application Ser. No. 10/728,599 filed Dec. 4, 2003 and U.S. Pat. No. 7,402,627 based thereon, U.S. application Ser. No. 11/193,131 filed Jul. 29, 2005, U.S. application Ser. No. 11/319,840 filed Dec. 28, 2005, and U.S. application Ser. No. 12/177,071 filed Jul. 21, 2008, is incorporated by reference in its entirety.

All concentrations and amounts disclosed in this specification are by weight unless indicated otherwise; concentrations and amounts indicated as being no greater than a certain number are to be interpreted to mean from and including zero up to the stated concentration or amount.

DETAILED DESCRIPTION OF CERTAIN PREFERRED EMBODIMENTS

A central feature of our invention is the discovery of environmentally friendly, "green" colorant compositions, and aqueous latex paints as well as other water-borne coatings, which enable the substantial mitigation of undesirable environmental effects attendant upon use of colorant compositions for tinting aqueous latex paint or other water-borne coatings, and the paints or other coatings made utilizing such compositions, with concomitant maintenance of high-level performance of such paints and other coatings in respect of Stormer low-shear viscosity stability, rheological profile, flow/leveling and sag resistance, water sensitivity, and color transfer resistance. In certain advantageous embodiments, blocking resistance and gloss retention are additionally maintained at a high performance level. The foregoing is achieved by the careful restriction of materials from which the colorant compositions and paints or other coatings of the invention are formed solely to those that intrinsically—or as a consequence of appropriate processing—do not entail the presence of VNCs, APEs or derivatives thereof, crystalline silica or formaldehyde. Unlike preceding colorant compositions and aqueous latex paints or other water-borne coatings, our invention proceeds from the discovery that, contrary to conventional wisdom, it is not necessary to settle for one but not the other of good purity and good properties. That is so say, while there would have seemed to be a fundamental tension between mitigating environmental disadvantages on the one hand, and preserving a strong performance contour on the other, that tension is resolved through practice of the invention whereby both desiderata are enabled. The dual objectives are attainable with the realization that certain beneficial combinations of components and processing measures obviate the apparent dichotomy between addressing environmental concerns and achieving desirable colorant and paint/coating performance.

Thus, in the colorant compositions used for tinting aqueous latex paints or other water-borne coatings the total amount of VNCs, APEs and derivatives thereof, crystalline silica, and formaldehyde present in the aggregate is not greater than 0.25 weight %, based on the weight of the colorant composition. Further, any amount present of the aforementioned constituents in the aggregate is preferably no greater than 0.15 weight %, and more preferably no greater than 0.1 weight %. Embodiments of the colorant compositions which are substantially entirely or completely free of the aforementioned substances are most preferred.

In certain good embodiments of the inventive colorant composition: (i) the content of any VNCs is preferably no greater than 1000 ppm and more preferably no greater than 300 ppm; (ii) the content of any APEs or derivates thereof is no greater than 1000 ppm and preferably no greater than 300; (iii) any content of crystalline silica is preferably no greater than 100 ppm and more preferably no greater than 5 ppm; and (iv) any content of formaldehyde is preferably no greater than 10 ppm and more preferably no greater than 5 ppm. Accordingly, the colorant compositions, whether before or after incorporation in an aqueous latex paint or other water-borne coating, do not have an appreciably negative impact on the environment.

In other good embodiments of the invention, the aqueous latex paint or other water-borne coating: (i) the content of any VNCs is preferably no greater than 500 ppm and more preferably no greater than 300 ppm; (ii) the content of any APEs or derivatives thereof is preferably no greater than 100 ppm; (iii) the content of any crystalline silica is preferably no greater than 100 ppm and more preferably no greater than 5 ppm; and (iv) the content of any formaldehyde is preferably no greater than 5 ppm.

As indicated in a preceding passage of this disclosure, it is also advantageous that a colorant composition of the invention be free—or at least substantially free—of HAPS. Thus, in an alternative embodiment of the invention the colorant composition is substantially, and preferably substantially entirely, free of HAPS (as opposed to the target substances per se, though there can be overlap). Likewise, in another alternative embodiment of the invention the aqueous latex paint or other water-borne coating is substantially, and preferably substantially entirely, free of HAPS (again, as opposed to the target substances per se, though there can be overlap).

The invention focuses on the reduction of a number of commonly encountered but environmentally undesirable substances:

VNCs, often (but not exclusively) VOCs, are incorporated in many components of a typical paint or coating, and colorant compositions to increase flexibility as a result of enabling use of a wider variety of component materials, especially resins, as well as to improve open time, freeze-thaw stability, flow/leveling, and gloss development. Thus, coalescence solvents used to improve paint performance, freeze thaw additives to prevent freezing when shipping, surfactants for dispersing pigments and providing application properties, and defoamers, along with other additives, typically comprise some volatiles intrinsically or through incorporated solvents. Low or zero volatile versions of these additives generally exhibit poorer performance as compared to counterparts with higher volatiles contents, and are more expensive. Replacement of these constituents is not trivial since all must be water-soluble or water-dispersible, have good stability in water, and otherwise be compatible (and perform their intended functions in combination) with sometimes twenty or thirty other components of the coating or colorant, and in many different product lines. Residual monomers and impurities in latexes can also be volatiles. These are common by-products of the manufacture of these latexes. They are very frequently found in all latexes in small quantities unless expensive and time consuming steps are taken to reduce their levels. Also, such steps have been associated in the past with poor latex stability and performance.

APEs and their derivatives are some of the most economical, best performing and widely used substances in the coatings industry. They are found in latexes, rheology modifiers, defoamers, biocides, surfactants and many other additives, and facilitate both incorporation into a formulation and performance enhancement. While there has been some information furnished to address the availability of substitutes for the various materials based on APES and derivatives thereof, this is general in nature and based on intended uses, and not keyed to diminishing the content of APEs or derivatives thereof while still maintaining an acceptable performance contour. Achieving the latter still requires extensive testing or other investigation, and innovative selection, to find a suitable alternative substance or blend of substances. In many cases a comparable surfactant using alternative chemistry is not available.

Crystalline silica is found as a naturally occurring impurity in many fillers commonly used to formulate paint or other coatings, and colorant compositions. Most of the fillers used in paints, particularly flat paints, and other coatings contain extender pigments that have crystalline silica impurities. Forgoing use of materials containing crystalline silica can sometimes contribute to degradation of final film properties.

Formaldehyde is introduced during paint and colorant formulation, mainly as part of a formaldehyde releasing biocide or as an impurity. Formaldehyde releasing biocides are some of the most common, least expensive and most effective biocides used in coatings to prevent spoilage of the product.

Mitigation of the presence of the aforementioned solvents, additives or impurities is highly beneficial. VNCs can degrade the atmosphere when released into it (see Green Seal GS-11 Standard). Moreover, some of them are typical and significant sources of residual odor associated with latex consumer paints directly due to their incorporation as or as part of a coalescing solvent (for instance, 2,2,4-trimethylpentanediol monoisobutyrate (Texanol)). (VNC levels can be determined via a headspace gas chromatography/mass spectroscopy method as described hereinafter.) Similarly, APES and derivatives thereof can also be harmful to the environment, particularly aquatic life, and thus are undesirable from an environmental standpoint. (APEs and derivatives thereof, such as nonyl phenol ethoxylates or octyl phenol ethoxylates, and derivatives thereof, can be determined, both qualitatively and quantitatively, using a UV spectrophotometer or LC-UV spectrophotometer.) Crystalline silica has been linked to a number of health concerns (see Green Seal Crystalline Silica Clarification issued Sep. 25, 2009). And, formaldehyde also gives rise to health concerns connected with its release into the environment from a colorant composition, or an aqueous latex paint or other water-borne coating, containing same.

Accordingly, the invention's efficacy in providing environmentally friendly products is apparent. However, the crux of the invention is not simply that "greening" is achieved, but that "greening" is achieved in concert with maintenance at a high level of the performance of aqueous latex paints or other water-borne coatings made from such colorant composition. That is to say, with our invention the overall performance contour is highly advantageous in that: (i) the viscosity stability of the paint vis-à-vis its precursor tint base is good, the paint's Stormer low-shear viscosity not being substantially changed in comparison to that of the tint base by addition of the colorant composition to the base during paint formulation; (ii) the rheology profile, flow/leveling properties and sag resistance, of the paint are good; (iii) the paint's water-sensitivity is good; and (iv) the paint's color transfer resistance (e.g., due to "rub-off") is likewise good.

More specifically, copolymer surfactants incorporated pursuant to the invention—which are substantially free of the previously identified solvents, additives and impurities—interact with latex particles and/or with associative rheology modifiers of a tint base or other aqueous (or water-borne) dispersion (also substantially free of the previously identified solvents and impurities), as well as of a latex paint or other water-borne coating in accordance with the invention. These copolymer surfactants can associate beneficially with surfaces of film-forming (e.g., latex) particles and with "bridging micelles" of associative thickeners. Without wishing to be bound by theory, it is thought that the presence of such copolymer surfactants does not substantially change the Stormer low-shear viscosity, and instead substantially preserves the network structure of latex paints and other water-borne coatings. That is, colorant compositions of the present invention are such that, when incorporated in a paint or other coating of the invention formed of a mixture comprising such a composition and a tint base (i.e. aqueous latex base paint or other aqueous polymer dispersion), they do not result in a substantial change of the Stormer low-shear viscosity of said paint/coating compared with the Stormer low-shear viscosity of the tint base. Practice of the invention thus yields the desired mitigation of any substantial change in the Stormer low-shear viscosity of the paint or other coating compared with the Stormer low-shear viscosity of the tint base. In advantageous embodiments of the invention, the Stormer low-shear viscosity of a paint or other coating tinted with a colorant composition of the invention is within about ±20%, preferably ±15%, of the Stormer low-shear viscosity of the tint base from which the paint or other coating was formed. An even more preferred embodiment is one in which the low-shear viscosity of a paint or other coating tinted with a colorant composition of the invention is within about ±10%, especially ±5% of the low-shear viscosity of the tint base from which the paint or other coating was formed.

Another advantage of the invention is the colorant composition does not have appreciable influence on the flow/leveling properties of a "greened" aqueous latex paint. In one embodiment, a paint of the invention has a flow/level rating, measured at 25° C. according to ASTM Standard D4062-99, of at least 8 on a scale of from 1 to 10, with 10 being the best flow/level characteristics. In another embodiment, a paint of the invention has a flow/level rating, measured in the same way, of about 9. In another embodiment, a paint of the invention has a flow/level rating, measured in the same way, of about 10. On the one hand, if the rheology profile is flawed such that the paint is too stiff, brush marks may be left when the paint is applied to a substrate. Conversely, if the rheology profile of an aqueous latex paint is such that the paint is too thin, the paint may be drippy when applied to substrate, such that the point film will run unacceptably. This is known as "sag", and the capacity of a paint to remain where applied rather than run or drip is called "sag resistance". This property can be measured in different ways, but for purposes of the present invention is determined using a Leneta anti-sag matter. The higher the index number is, the better the sag resistance is. Different sag resistance may be dictated by different applications. In general for architectural paints, an index number of 11 and above is considered to have excellent sag resistance. An index number from 8-10 has moderate or good sag resistance. An index number of 7 or below may cause significant drippings or running of paints on the substrates during application. With our invention sag resistance is at least 8, preferably at least 10, and more preferably at least 11.

Further, the inventive paint's water sensitivity is not adversely affected. The term water sensitivity refers to the tendency of a paint to be degraded as a consequence of contact with water. This sensitivity, and conversely resistance to it, can be measured on draw downs dried for a controlled duration of time. A few drops of water can be deposited on the paint surface for a suitable time period. The water is wiped off and the wetted surface scratched with a finger nail to check the hardness of the film. The paint surface is rated from 1 to 5, with 5 designating the hardest film, and thus indicating the least amount of water sensitivity. In accordance with our invention, water sensitivity is at least 3, preferably at least 4, and more preferably at least 5.

Moreover, color transfer is similarly not unacceptably affected. The term "color transfer" refers to the incapability of a paint or other coating to retain its constituent pigmentation under adverse conditions. Color transfer (or color rub-off), and conversely color transfer resistance, for tinted aqueous latex paints or other water-borne coatings can be measured utilizing draw downs dried for a controlled duration of time. More specifically, a typical color transfer test is performed on drawdowns of paints or coatings to be tested, tined with colorants or colorant compositions. The drawdowns are prepared using BYK-Gardner byko-charts with a 3-mil bird applicator bar. The drawdown films are dried for 7 days at ambient conditions before testing. A BYK-Gardner Abrasion Tester with a boat weighing 1000 grams is used to measure color transfer. A wet white fabric sheet is attached to the lower surface of the boat which is placed on the drawdown films. The films are scrubbed for 10 cycles and then the white fabric sheet is removed from the boat and dried for one day. The dried white fabric sheet is examined for the color transferred from the drawdown films. A rating of 1 to 5 is assigned to each specimen with 5 being the most resistant to color transfer. The invention yields color transfer of at least 3, preferably at least 4, and more preferably 5.

The colorant composition of the invention is effective as an additive to a tint base, i.e., an aqueous latex base paint or other water-borne base dispersion, to tint (or color) same. A tint base typically comprises water, at least one film-forming polymer and optionally one or more surfactants dispersants. It will be understood by those of ordinary skill in the art that the tint base can contain other additives conventionally incorporated therein, including optionally (at least in the case of tint bases) one or more white or other base pigments as well as extender pigments, in customary amount. That said, the tint base has a sufficiently low content of the target substances, i.e., VNCs, APEs or their derivatives, crystalline silica and formaldehyde, that the requirements of the invention can be met. The tint base is preferably substantially free, and more preferably substantially entirely free, of the target substances.

The colorant compositions may be added to tint bases at the point of sale, prior to use or during the manufacturing process. The colorant composition embodiments of the invention are particularly beneficial because often industry claims concerning low VNC or other solvent/additive/impurity levels relate to base paints or other compositions. If colorant compositions combined with tint bases unfortunately have not been brought into environmental compliance, then the good work done in "cleaning up" the base material will be undone when the colorant composition is introduced, and this will carry over into the final paint or other coating. By utilization of the colorant compositions of the invention, the re-introduction of environmentally significant amount of VNCs, APEs and derivatives, crystalline silica, and formaldehyde is avoided. Extensive research and development has been conducted to develop tint base products that meet various of the standards mentioned above, particularly in respect of VNC levels. But, the standards and efforts to conform paint or other coatings thereto typically do not extend to colorant compositions. Novel colorant compositions that can be formulated to meet the standards are described herein. Thus, certain good embodiments of the inventive colorant compositions are capable of being added to a tint base without: attenuation of Stormer low-shear viscosity stability; degradation of the rheology profile, flow-leveling properties and sag; appreciably heightened water-sensitivity; and exacerbated color transfer. Such embodiments of the colorant composition comprise at least one pigment, water, and a color surfactant as aforesaid, with any VNCs being of amount no greater than 1000 ppm, any APEs or derivatives thereof being of amount no greater than 1000 ppm, any crystalline silica being of amount no greater than 100 ppm, and any formaldehyde being of an amount no greater than 10 ppm.

Furthermore, in certain good embodiments blocking resistance and gloss are likewise not adversely affected in any material sense as well.

The substantial elimination of solvent (non-aqueous), additive and impurity content as described herein is achieved through recognition of such elimination's feasibility (i.e., substantial elimination with high level performance-retention as aforesaid), and the implementation of materials-selection and/or -processing measures to secure suitably pure components for making the inventive colorant composition and aqueous latex paint or other water-borne coating. Accordingly, in certain preferred embodiments none of the components of the colorant composition, or of the tint base with which it is combined, has a VNC-, APE- or APE-derivative, crystalline silica-, or formaldehyde-content such that the combination of those components has an aggregate content thereof greater than 0.30 weight %. Moreover, in certain good embodiments neither any colorant composition nor tint base has a content of any of those solvents and impurities which in the paint or coating resulting from their combination is of amount greater than 0.15 weight %.

The requisite materials purity as described in the preceding paragraph is brought about by exercising careful attention to, including if necessary testing of, the levels of the aforementioned impurities and contaminants in precursor substances utilized to formulate each colorant composition and tint base. In many instances this can be accomplished by researching reliable published information about the constituents of the precursor material materials typically obtained from outside sources (such as Materials Safety Data Sheets).

As mentioned previously, unlike the other target substances, crystalline silica is normally present solely as an included impurity, and thus need not be replaced by another material which conforms to the requirements of our invention. As for the other target substances, removing them can significantly degrade performance. Thus, close attention must be paid to their replacements. The following is a set of guidelines for selection of suitable materials pursuant to our invention.

Low/zero-VNC materials include organic compounds with boiling points above about 220° C., preferably above about 250° C. and more preferably above about 270° C., which therefore do not evaporate or flash, i.e., which are non-volatile at normal indoor and outdoor temperatures. Some coalescence aids can eventually form chemical bonds with polymers, and thus are capable of becoming a part of the polymer binder. These coalescence aids work as plasticizers that soften the latex polymer particles for film formation. Unlike traditional coalescence solvents that evaporate from paints, coalescence aids with low/zero VNC's stay in the dried paint films for an indefinite period of time.

Examples of suitable low- or zero-VNC coalescing agents that may be used in the present invention in amounts that would not significantly increase the composition's VNC-content include (without limitation): dicarboxylic/tricarboxylic esters, such as trimethyl trimellitate (TMTM), tri-(2-ethylhexyl)trimellitate (TEHTM-MG), tri-(n-octyl, n-decyl) trimellitate (ATM), tri-(heptyl, nonyl)trimellitate (LTM) and n-octyl trimellitate (OTM); adipates, such as bis(2-ethylhexyl)adipate (DEHA), dimethyl adipate (DMAD), monomethyl adipate (MMAD) and dioctyl adipate (DOA); sebacates, such as dibutyl sebacate (DBS); maleates such as dibutyl maleate (DBM) and diisobutyl maleate (DIBM); benzoates; epoxidized vegetable oils such as Methyl toluene sulfonamide, N-(2-hydroxypropyl)benzene sulfonamide and N-(n-butyl)benzene sulfonamide; organophosphates such as tricresyl phosphate (TCP) and tributyl phosphate (TBP; triethylene glycol dihexanoate; and tetraethylene glycol diheptanoate.

A useful coalescence aid is Optifilm Enhancer 300, which is a low-VOC, low odor "green" coalescent for emulsion paints. See "Optifilm Enhancer 300, A Low Odor, Non-VOC, 'Green' Coalescent for Emulsion Paint," Eastman Chemical Company, Publication M-AP315, April 2005. Optifilm Enhancer 300 can be utilized in formulating a variety of architectural coatings. With a boiling point of 281° C. and an empirical formula of $C_{16}H_{30}O_4$, it is a non-volatile organic compound that is particularly suitable for low odor flat and semi-gloss (including soft sheen, satin, vinyl silk and eggshell) interior wall paints. See "Eastman Coatings Film Technologies Film Optimization for Architectural Coatings," Eastman Chemical Company, 2005.

Another useful coalescence aid is Optifilm Enhancer 400, which is a very low VOC, low odor coalescent that gives good film integrity, touch-up properties and scrub resistance. With a boiling point of 344° C., Optifilm Enhancer 400 is an alternate to ortho-phthalates such as butyl benzyl phthalate (BBP) and dibutyl phthalate (DBP) as plasticizers. See "Optifilm Enhancer 400—A Non-Phthalate Alternate," Eastman Chemical Company. Publication TT-75, May 2006. Optifilm Enhancer 400 is able to reduce the minimum film forming temperature (MFFT) of various latexes in a more efficient manner than BBP. Because Optifilm Enhancer 400 becomes an integral part of the paint film, it adds to the flexibility of the paint coating.

Yet another useful coalescence aid is Archer Reactive Coalescent (Archer RC™), which is a propylene glycol monoester of unsaturated fatty acids derived from vegetable oils. Archer RC™ is found to be nonvolatile when tested by EPA Method 24, possibly due to the oxidation and subsequent crosslinking of its unsaturated component.

Still another useful coalescence aid is BASF Pluracoat™ CA 120 (ES8511). The Pluracoat™ brand materials are organic liquids based on proprietary technology from BASF. They are rated zero-VOC and can be used for low- or zero-VOC latex paints.

Coalescing agents in the nature of benzoate esters or alkyl benzoate esters, such as those sold under Benzoflex® and Velate®, and low molecular weight polyesters, such as those sold under Admex®, are likewise useful.

All of these coalescents must be tested in the compositions and monitored for performance and stability. In many cases, the formula or its components such as resins, dispersants or thickeners must be modified to perform acceptably with low/zero VNC coalescents. These modifications will be within the ordinary skill of the art, once the invention's practitioner is in possession of the teachings herein.

Correspondingly, suitable surfactant and similar materials rated low- or zero-APE can be anionic and comprise $C_{13}$ alkyl ethoxylated to "low" extent (such as Rhodapex EST-30 SBL), and $C_{13}$ alkyl ethoxylated to "medium" extent (such as Rhodafac RS-610 and RS-710). These are available from Rhodia. Other Rhodia anionic materials containing proprietary hydrophobes ethoxylated to either "low" extent (such as Abex 2005) or to "high" extent (such as Abex 18S and Abex 21355) are also useful.

Additionally, suitable surfactant and similar materials rated low- or zero-APE can be nonionic and comprise $C_{13}$ alkyl with an "HLB" range of 14.0-15.0 (such as Rhodasurf 8C-720), or comprise $C_{16}C_{18}$ alkyl with an "HLB" range of 17.5-19.0 (such as Rhodasurf CET55 E) or tristyrylphenol (such as Sopraphor TS80-60), with an "HLB" range of 17.5-19.0. These are likewise available from Rhodia. Yet other Rhodia nonionic materials containing a proprietary hydrophobe are Abex 2525 with an "HLB" range of 15.0-17.5 and Abex 2545 with an "HLB" range of 17.5-19.0.

As above, any modifications necessary in respect of other constituents will be within the ordinary skill of the art once the invention's practitioner is in possession of the disclosure herein.

Examples of pH adjustors with low/zero VNC's useful in practicing the invention can include, but are not limited to, sodium hydroxide, sodium carbonate, sodium bicarbonate, potassium hydroxide, potassium carbonate, potassium bicarbonate, and the like, and combinations of two or more thereof.

Suitable biocides that do not release or contain formaldehyde include those sold under the names Kathon, Rocima, or Kordek from Rohm and Haas, or those containing 1,2-Benzisothiazolin-3-one (BIT) under the Proxel name, or zinc omadine available from Arch Biocides, or 5-Chloro-2-Methyl-4-Isothiazolin-3-one (CIT) or 2-Methyl-4-Isothiazolin-3-one (MIT) which are commercially available under the name Canguard from Dow Chemical Company. All of these biocides exhibit a wide range of efficacy and need to be extensively screened and tested in the inventive formulations for performance and stability. In many eases blends or mixtures of these biocides may be needed. A preferred biocide is Proxel BZ plus available from Arch Biocides, which is a blend of two formaldehyde free compounds.

If there is any question about materials supplied by others, or if the materials are made in-house, it is often prudent to verify by testing (at least on a random or representative basis) that appropriately low levels of impurities and contaminants are exhibited. The foregoing applies also to colorant compositions and tint bases combined to form aqueous latex paints or other water-borne coatings, as well as to the product paints and coatings themselves. Once in possession of the teachings herein, one of ordinary skill in the art will be able to select and carry out test procedures suitable for determining levels of solvents, additives and impurities as discussed, without the exercise of inventive skill and as a matter of routine practice.

In the event any of the precursor materials, or a colorant composition or tint base (or even a product paint or coating in principle) is believed to have too great a content of one or more of the aforementioned solvents and impurities, or this is indicated by the results of testing, then suitable processing can be conducted to remove or decrease the content of impurity or contaminant as desired. The nature of such processing will vary based on the impurity or contaminant in question. For example, VNCs and APEs as well as derivatives thereof can be removed by any of the following measures, or combinations of same, its being understood that the techniques described can be applied not only to latex materials but more broadly to a wide range of dispersions.

Stripping is one of several methods that can be used to remove unwanted materials. Generally, stripping can be accomplished by means of increased temperature, decreased pressure or vacuuming, chemical solvents, steaming, various means of physical agitation, and combinations thereof. Stripping can take place either in one continuous operation or in batch or semi-batch operations. Various stripping processes are known in the art.

U.S. Pat. No. 3,003,930 discloses one stripping method. More specifically, the '930 patent discloses a tower of trays through which a dispersion cascades in order that volatile organic hydrocarbons may be removed. Increased temperature as well as steam or other inert gasses are used to volatize the volatile organic hydrocarbons. Measures are taken to prevent foaming, which obstructs the escape of the hydrocarbon vapor, as well as re-entrainment of hydrocarbons.

U.S. Pat. No. 5,516,818, discloses a stripping process involving contacting a dispersion with a small amount of an organic solvent which acts as a stripping aid and subjecting the dispersion to stripping using steam or an inert gas such as nitrogen. The solvent can be either introduced in the stripping apparatus with the stripping gas, or it can be mixed with the dispersion prior to introducing the latex into the stripping apparatus. The process of the '818 patent can be carried out in a batch or semi-batch mode.

U.S. Pat. No. 6,353,087 discloses a stripping process, wherein a dispersion is heated and an inert gas such as steam is sparged through the dispersion to remove volatiles. This process also utilizes an agitator and a mechanical foam breaker. The '087 patent also teaches the use of combinations of: (1) increasing the pH of the dispersion prior to and during stripping from 7 to 11; and (2) maintaining the temperature of the dispersion at from 30° C. to 70° C. during stripping. In some embodiments, a vacuum is used so that stripping can be performed at lower temperatures.

U.S. Patent Application Publication No. 2006/0270815, entitled Polymerization of Diisopropenylbenzene, discloses the use of vacuum distillation to remove residual compounds from dispersion, which may be used in paint.

In accordance with one particular aspect of the present invention, a dispersion is treated by steam stripping at about 85° C. to 97° C. and applying vacuum. Excessive foaming is controlled by the degree of vacuum applied.

A distinct but related process called chemical chasing involves adding chemicals that react with unwanted materials. Such chemicals include, but are not limited to, tertiary butyl hydroperoxide, ammonium persulfate, potassium persulfate, or sodium persulfate which, for example, may react with carbon-carbon double bonds of the unwanted materials. Chemical chasing can be used alone or with stripping to further reduce unwanted materials.

Yet another means of removing undesired material from polymer dispersions involves contacting the dispersion with a stripping medium, such as steam or gas, in the presence of an adsorbent material such as carbon black, activated charcoal, silica gel, aluminum oxide or ferric oxide. For instance, in U.S. Pat. No. 6,348,636, discrete quantities of the particulate adsorbent material are provided in permeable flow-through enclosures (e.g., in a manner analogous to teabags). Preferred adsorbent materials of the '636 patent include activated carbon, e.g., Cal 12×40, a granular decolorizing carbon sold by Calgon Carbon Corporation.

Columns or ion exchange columns may also be used to purify a dispersion. For example, U.S. Pat. No. 4,130,527 discloses that an unwanted material, such as vinyl chloride monomer, can be removed from an aqueous dispersion, such as polyvinyl chloride, by allowing the dispersion to flow as a thin liquid film down the inner surface of a substantially vertical column at sub-atmospheric pressure countercurrent to an ascending flow of steam. In Example 1 of U.S. Pat. No. 5,055,197, an ion exchange column is used to remove an unwanted material. Another example of the use of a column apparatus to purify polymer dispersions is disclosed in U.S. Pat. No. 6,740,691. In the '691 patent, a latex/dispersion is cascaded down a column equipped with internals in countercurrent flow with water vapor and/or air. Internals such as random packing, structured packing and especially trays are disposed through the column to provide multiple stages of mass transfer.

For its part, crystalline silica can be removed by precipitation, such as in precipitated calcium carbonates, or by washing.

Other processing measures which yield the result sought can also be utilized as long as they are not antithetical to attainment of the objects of the invention. It goes almost without saying, especially when two or more solvents, additives or impurities are being treated, that the various processing steps can be utilized separately, sequentially, simultaneously or in any other practical manner.

The definitions hereinafter will be useful in understanding the scope of the invention and are applicable to the entire discussion in this specification.

As used in this specification, "alkyl" shall be deemed to encompass species comprising one or more of a saturated straight chain or branched noncyclic hydrocarbon having from 1 to 30 carbon atoms. Representative saturated straight chain alkyls include -methyl, -ethyl, -n-propyl, -n-butyl, -n-pentyl, -n-hexyl, -n-heptyl, -n-octyl, -n-nonyl, -n-decyl and the like. Representative saturated branched alkyls include -isopropyl, -sec-butyl. -isobutyl, -tert-butyl, -isopentyl, -2-methylbutyl, -3-methylbutyl, -2,2-dimethylbutyl, -2,3-dimethylbutyl, -2-methylpentyl, -3-methylpentyl, -4-methylpentyl, -2-methylhexyl, -3-methylhexyl, -4-methylhexyl, -5-methylhexyl, -2,3-dimethylbutyl, -2,3-dimethylpentyl. -2,4-dimethylpentyl, -2,3-dimethyleyl, -2,4-dimethylhexyl, -2,5-dimethyleyl, -2,2-dimethylpentyl, -2,2-dimethylhexyl, -3,3-dimethylpentyl, -3,3-dimethylhexyl, -4,4-dimethylhexyl, -2-ethylpentyl, -3-ethylpentyl, -2-ethylhexyl, -3-ethylhexyl, -4-ethylhexyl, -2-methyl 2-ethylpentyl, -2-methyl-3-ethylpentyl, -2-methyl-4-ethylpentyl, -2-methyl 2-ethylhexyl, -2-methyl-3-ethylhexyl, -2-methyl-4-ethylhexyl, -2,2-diethylpentyl, -3,3-dethylhexyl, -2,2-dethylhexyl, -3,3-dethylhexyl and the like.

Also as used in this specification. "alkylphenyl" shall be deemed to encompass species comprising one or more phenyl groups each substituted with at least one alkyl group, where alkyl is as defined above.

Further, as used in this specification, "styrylphenyl" shall be deemed to encompass species comprising a phenyl group substituted with a styryl group, i.e., a vinyl benzene group where the unsubstituted carbon atom of the vinyl is bonded to the phenyl ring. Thus, in the strictest sense, in a monostyrylphenyl group, one vinyl benzene group is bonded to phenyl; in a distyrylphenyl group, two vinyl benzene groups are bonded to phenyl; and in a tristyrylphenyl group, three vinyl benzene groups are bonded to phenyl. However, it is to be understood that as, e.g., a commercially-available tristyrylphertylpoly(ethyleneoxy)(meth)acrylate (i.e., the compound designated by CAS Reg. Number 174200-85-2) can be a mixture of monostyrylphenylpoly(ethyleneoxy) (meth)acrylate, distyrylphenylpoly(ethyleneoxy)(meth) acrylate and/or tristyrylphenylpoly(ethyleneoxy)(meth) acrylate, as used herein, the term "tristyrylphenyl," when used either alone or as a portion of a chemical name and unless otherwise indicated, includes monostyrylphenyl, distyrylphenyl, tristyrylphenyl, or a mixture thereof.

Colorant Compositions

The inventive colorant compositions typically comprise not only water, a pigment and a copolymer surfactant (which can be present as a dispersion of the polymer), but can also contain: one or more additional surfactants and/or dispersants; one or more water-dispersible polymers; one or more low number average molecular weight polymers (such as polyethylene glycol or polypropylene glycol) each with an average molecular weight of about 300-about 8,000 Daltons; and one or more rheology modifiers, for instance thickeners, especially associative thickeners; provided however that none of such further components shall constitute, incorporate or be accompanied by a VNC, an APE or derivative thereof, crystalline silica, or formaldehyde. In some cases the colorant composition can even comprise a film-forming or other latex binder component, though the colorant composition embodiments do not contain film-forming latex binder amounts sufficient for the formation of a suitable paint film, and thus do not constitute a tint-base or other aqueous polymer dispersion, or a latex paint or other waterborne coating as meant in this disclosure.

Each colored pigment included in a colorant composition (or an aqueous latex paint or water-borne coating, for that matter) of the invention can be an organic pigment or an inorganic pigment; such pigments are well-known in the art. Organic pigments include phthalocyanine blue, phthalocyanine green, monoarylide yellow, diarylide yellow, benzimidazolone yellow, heterocyclic yellow, DAN orange, quinacridone magenta, quinacridone violet, organic reds, including metallized azo reds and nonmetallized azo reds, and the like. Exemplary azo reds include lithols, lithol rubine, toluidine red, naphthol red and quinacridone red. Metallized azo reds are salts containing metal cations, such as barium or calcium salts of azo reds, e.g., calcium lithol rubine and barium lithol red. Nonmetallized azo reds are substantially free of metal cations. Inorganic pigments include titanium dioxide white, carbon black, lampblack, black iron oxide, yellow iron oxide, brown iron oxide, red iron oxide, and the like.

Each white pigment, off-white pigment or extender pigment included in a colorant composition or (aqueous latex paint or water-based coating) of the invention can comprise a titanium dioxide, or other suitable white pigment, off-white pigment or extender pigment, for example talc or silica, known in the art.

The copolymer surfactant comprises one or more component units corresponding to unsaturated carboxylic acid and/or unsaturated anhydride monomers. Typically, a copolymer surfactant has a polymeric backbone chain ("chain") comprising at least one hydrophobe, in another embodiment two or more or hydrophobes, and a plurality of hydrophiles, such as two or more monomer units of an α,β-ethylenically unsaturated carboxylic acid or anhydride, copolymerized into the copolymer backbone of the copolymer surfactant. The surfactant monomer contributes towards hydrophobicity. e.g., by its alkyl, or tristyrylphenyl groups, thereby facilitating the desired association with various types of hydrophobic groups of pigments and of other coating ingredients. Hydrophilic groups, such as carboxylic acid and/or anhydride groups, impart solubility to the copolymer surfactant in an aqueous phase, when neutralized, and also facilitate the dispersion of inorganic pigments. Other comonomer components of the copolymer surfactant can be used to adjust the balance between the hydrophobicity and hydrophilicity of the copolymer surfactants.

Representative species include mono and dicarboxylic acids, such as acrylic acid, methacrylic acid, crotonic acid, itaconic acid, maleic acid, fumaric acid, angelic acid, glutaconic acid, cinnamic acid, carboxyl cinnamic acid, styrene dicarboxylic acid, and the like. Half-esters of the dicarboxylic acids with alkanols can also be used, as can anhydrides. Maleic anhydride, 4-vinyl-isobenzofuran-1,3-dione and 5-vinyl-isobenzofuran-1,3-dione are exemplary $C_3$-$C_{12}$ α,β-ethylenically unsaturated carboxylic anhydrides.

In various good embodiments of the invention a copolymer chain includes units derived from one and only one $C_3$-$C_{12}$ α,β-ethylenically unsaturated carboxylic acid or anhydride monomer. In other embodiments a copolymer chain includes units derived respectively from two separate $C_3$-$C_{12}$ α,β-ethylenically unsaturated carboxylic acid or anhydride monomers which are present in a copolymer surfactant chain. And in yet other embodiments a copolymer chain includes units derived respectively from three $C_3$-$C_{12}$ α,β-ethylenically unsaturated carboxylic acid or anhydride monomers. It is, of course, to be understood that when units corresponding respectively to two or more separate $C_3$-$C_{12}$ α,β-ethylenically unsaturated carboxylic acid or anhydride monomers are present in a copolymer chain, each separate monomer can be an acid or an anhydride independently of the other(s).

In certain good embodiments, the one or more unsaturated carboxylic acid or anhydride monomers are present in the polymerization process at a concentration of from about 10% to about 80% by weight, preferably about 15% to about 50% by weight, and more preferably about 20% to about 45% by weight, based on the total weight of all monomers and chain transfer agent(s) from which the copolymer is formed. In another embodiment component units corresponding to acrylic acid are present at a concentration of from about 20% to about 45% by weight, based on the total weight of all monomers and chain transfer agent(s) from which the copolymer is formed.

The copolymer surfactant also comprises vinyl monomers. Monomers of this type suitable for use in accordance with the present invention include any compounds having vinyl functionality, i.e., ethylenic unsaturation, exclusive of compounds having acrylic functionality, e.g., acrylic acid, methacrylic acid, esters of such acids, acrylonitrile and acrylamides. Preferably, the vinyl monomers are selected from the group consisting of vinyl esters, vinyl aromatic hydrocarbons, vinyl aliphatic hydrocarbons, vinyl alkyl ethers and mixtures thereof.

Suitable vinyl monomers include vinyl esters, such as, for example, vinyl propionate, vinyl laurate, vinyl pivalate, vinyl nonanoate, vinyl decanoate, vinyl neodecanoate, vinyl butyrates, vinyl benzoates, vinyl isopropyl acetates and similar vinyl esters; vinyl aromatic hydrocarbons, such as, for example, styrene, methyl styrenes and similar lower alkyl styrenes, chlorostyrene, vinyl toluene, vinyl naphthalene and divinyl benzene; vinyl aliphatic hydrocarbon monomers, such as, for example, vinyl chloride and vinylidene chloride as well as alpha olefins such as, for example, ethylene, propylene, isobutylene, as well as conjugated dienes such as 1,3-butadiene, methyl-2-butadiene, 1,3-piperylene, 2,3-dimethyl butadiene, isoprene, cyclohexene, cyclopentadiene, and dicyclopentadiene; and vinyl alkyl ethers, such as, for example, methyl vinyl ether, isopropyl vinyl ether, n-butyl vinyl ether, and isobutyl vinyl ether.

Examples of vinyl compounds typically comprising an α,β-ethylenically unsaturated vinyl monomer which contains from 2 to 12 carbon atoms include esters of acrylic and methacrylic acid, such as methyl methacrylate, ethyl acrylate, ethyl methacrylate, 2-ethylhexyl acrylate, butyl acrylate, butyl methacrylate, 2-hydroxyethyl acrylate, 2-hydroxybutyl methacrylate and the like; vinyl esters, such as vinyl acetate, vinyl butyrate, vinyl caprolate and the like; nitrile monomers, such acrylonitrile, methacrylonitrile and the like; vinyl chloride; vinylidene chloride; and the like. In another embodiment, the $C_3$-$C_{12}$ α,β-ethylenically unsaturated vinyl monomer is butyl acrylate, ethyl acrylate, ethyl methacrylate, methyl methacrylate, vinyl acetate, acrylonitrile, or a mixture thereof. In another embodiment, the $C_3$-$C_{12}$ α,β-ethylenically unsaturated vinyl monomer is butyl acrylate, ethyl methacrylate, methyl methacrylate, vinyl acetate, or a mixture thereof. In another embodiment, the $C_3$-$C_{12}$ α,β-ethylenically unsaturated vinyl monomer is butyl acrylate, ethyl methacrylate, vinyl acetate, or a mixture thereof.

While theoretically styrene could be characterized as a vinyl, for purposes of this disclosure suitable moieties which contain a styrenic group are characterized separately from other vinyl species. That being said, component units corresponding to styrenic monomers are likewise suitable. They include styrenic monomers, such as styrene, vinyltoluene, t-butylstyrene, isopropylstyrene, p-chlorostyrene and the like.

The copolymer surfactant can also comprise acrylic monomers. Such monomers suitable for use in accordance with the present invention comprise any compounds having acrylic functionality. Preferred acrylic monomers are selected from the group consisting of alkyl acrylates, alkyl methacrylates, acrylate acids and methacrylate acids as well as aromatic derivatives of acrylic and methacrylic acid, acrylamides and acrylonitrile. Typically, the alkyl acrylate and methacrylic monomers (also referred to herein as "alkyl esters of acrylic or methacrylic acid") will have an alkyl ester portion containing from 1 to about 18, preferably about 1 to 8, carbon atoms per molecule.

Suitable acrylic monomers include, for example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecyl acrylate and methacrylate, benzyl acrylate and methacrylate, isobornyl acrylate and methacrylate, neopentyl acrylate and methacrylate, 1-adamantyl methacrylate and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, amino acrylates, methacrylates as well as acrylic acids such as acrylic and methacrylic acid, ethacrylic acid, alpha-chloroacrylic acid, alpha-cyanoacrylic acid, crotonic acid, beta-acryloxy propionic acid, and beta-styryl acrylic acid.

Further examples of suitable monomers from which are derived component units of the copolymer surfactants include:

vinyl acetate, vinyl propionate, vinyl butyrate, vinyl isobutyrate, vinyl benzoate, vinyl m-chlorobenzoate, vinyl p-methoxybenzoate, vinyl alpha-chloroacetate, vinyl toluene, vinyl chloride, para vinyl benzyl alcohol, etc.

styrene, alpha-methyl styrene, alpha-ethyl styrene, alpha-bromo styrene, 2,6-dichlorostyrene, etc.;

allyl chloride, allyl acetate, allyl benzoate, allyl methacrylate, etc.;

ethylene, acrylonitrile, methacrylonitrile, dimethyl maleate, isopropenyl acetate, isopropenyl isobutyrate, acrylamide, methacrylamide, 1,3-butadiene, etc.;

acrylic acid, methacrylic acid, methyl acrylate, ethyl acrylate, propyl acrylate, isopropyl acrylate, butyl acrylate, isobutyl acrylate, ethylhexyl acrylate, amyl acrylate, 3,5,5-trimethylhexyl acrylate, methyl methacrylate, ethyl methacrylate, propyl methacrylate, dimethylaminoethyl methacrylate, isobornyl methacrylate, t-butyl methacrylate, ethyl tiglate, methyl crotonate, ethyl crotonate, 2-hydroxyethyl acrylate, 2-hydroxyethyl methacrylate, 2-hydroxypropyl acrylate, 4-hydroxybutyl methacrylate, 2-hydroxypropyl methacrylate, 3-hydroxybutyl acrylate, 4-hydroxybutyl acrylate, 4 hydroxypypentyl acrylate, 2-hydroxyethyl ethacrylate, 3-hydroxybutyl methacrylate, 2-hydroxyethyl chloroacrylate, diethyleneglycol methacrylate, tetra ethylene glycol acrylate, etc.

The copolymer surfactant also comprises one or more component units corresponding to a surfactant monomer. As used herein, the expression "surfactant monomer" shall be deemed to mean a compound having a hydrophilic moiety containing an unsaturated bond capable of entering into a polymerization reaction, and a hydrophobic moiety, connected by a bridging moiety comprising—and preferably joined to one another by a bridging moiety consisting essentially of—a polymeric moiety with repeating carbonyl groups. The expression encompasses, but is not limited to, species comprising one or more of at least one acrylic ester or methacrylic ester, i.e., a "(meth)acrylic ester," of an ethoxylated hydrophobic moiety, for instance, alkyl, alkylphenyl, monostyrylphenyl, distyrylphenyl, tristyrylphenyl and the like. The surfactant monomer can have a structure as depicted by the formula:

H$_2$C=C(X)—C(O)O-E-R  (1)

where X is hydrogen or methyl, E is a hydrophilic moiety such as ethoxylate and the like, and R is a hydrophobic moiety such as alkyl, alkylphenyl, monostyrylphenyl, distyrylphenyl or tristyrylphenyl and the like. Representative suitable surfactant monomers include the acrylic or methacrylic acid esters of nonionic surfactant alcohols, such as alkylpolyethyleneoxy (meth)acrylates or alkylphenylpolyethyleneoxy (meth)acrylates, where the alkyl group contains, independently, from 1 to 30 carbon atoms, and the tristyrylphenylpoly(ethyleneoxy) (meth)acrylates. In other embodiments, however, multiple surfactant monomers are present in a copolymer surfactant chain and provide a plurality or combination of the alkyl, or tristyrylphenyl hydrophobic groups. It is to be understood that, as used herein, the term "tristyrylphenyl," either alone or as a portion of a chemical name and unless otherwise indicated, includes any and all of monostyrylphenyl, distyrylphenyl, tristyrylphenyl, and mixtures of two or more thereof. The alkylpolyethyleneoxy (meth)acrylate or alkylphenylpolyethyleneoxy (meth)acrylate may have an alkyl group which contains, independently, from 1 to 22 carbon atoms or the alkylpolyethyleneoxy (meth)acrylate or alkylphenylpolyethyleneoxy (meth)acrylate may have an alkyl group which contains, independently, from 9 to 22 carbon atoms.

Additional examples of surfactant monomers include one or more of a nonylpoly(ethyleneoxy) acrylate, decylpoly(ethyleneoxy) acrylate, undecylpoly(ethyleneoxy) acrylate, oleylpoly(ethyleneoxy)methacrylate, behenylpoly(ethyleneoxy)methacrylate, tristyrylphenylpoly(ethyleneoxy)methacrylate, or a mixture thereof. Still further examples of surfactant monomers encompass species comprising one or more of behenylpoly(ethyleneoxy) acrylate, behenylpoly(ethyleneoxy)methacrylate, decylpoly(ethyleneoxy) acrylate, decylpoly(ethyleneoxy)methacrylate, tristyrylphenylpoly(ethyleneoxy) acrylate, tristyrylphenylpoly(ethyleneoxy)methacrylate, or a mixture thereof as well as species comprising one or more of behenylpoly(ethyleneoxy)methacrylate, decylpoly(ethyleneoxy) acrylate, tristyrylphenylpoly(ethyleneoxy) acrylate, tristyrylphenylpoly(ethyleneoxy)methacrylate, or a mixture thereof.

Further examples of surfactant monomers are species comprising one or more of a tristyrylphenylpoly(ethyleneoxy) acrylate, tristyrylphenylpoly(ethyleneoxy)methacrylate, tristyrylphenylpoly(ethyleneoxy) acrylate and tristyrylphenylpoly(ethyleneoxy)methacrylate, or a mixture thereof. Also, the surfactant monomer known as Nopol (described in U.S. Pub. App. No. US20060270563, incorporated by reference herein) may be used.

The copolymer surfactant can be a mono-hydrophobe, i.e., it can contain a single hydrophobic group per polymer chain. In another embodiment, the copolymer surfactant can contain multiple (i.e., two or more) hydrophobes, each of which can be the same or different, per polymer chain. In other embodiments, the copolymer surfactant can be a di-hydrophobe and contain two hydrophobe groups, which can be the same or different, per polymer chain. Conventional hydrophobically modified alkali soluble/swellable copolymers (i.e., HASCs) disclosed above are these types of surfactants. Other hydrophobically modified soluble/swellable copolymers are known.

It will be understood by one of ordinary skill in the art that component units corresponding to one or more types of surfactant monomers can be present. In some embodiments, one surfactant monomer unit is present in a copolymer surfactant chain. Thus, in various embodiments, two surfactant monomer units, which can, of course, be the same or different, are present in a copolymer surfactant chain. In yet other embodiments, three surfactant monomer units, which can, of course, be the same or different, are present in a copolymer surfactant chain. In still another embodiment, an average of one surfactant monomer unit is present in a copolymer surfactant chain. In another embodiment, an average of from about one to about two surfactant monomer units are present in a copolymer surfactant chain. In a further embodiment, an average of at least about two surfactant monomer units are present in a copolymer surfactant chain. The amount of one or more surfactant monomers is preferably from about 0.01% to about 20% by weight, more preferably be from about 0.03% to about 16% by weight, and especially preferably about 0.5% to about 13% by weight, based on the total weight of all monomers and chain transfer agent(s) from which the copolymer is formed.

In each of the surfactant monomers containing (ethyleneoxy) groups, the number of ethylene oxide units present is preferably from about 4 to about 200, more preferably from about 4 to about 60, and especially preferably from about 10 to about 40.

Once in possession of the teachings herein, one of ordinary skill will be able to determine, as a matter of routine testing and without undue experimentation, amounts of copolymer surfactant suitably incorporated in colorant compositions to secure the desired surfactant effect. The information, in the Examples hereinafter, confirms same. In various good embodiments of the invention, the amount of copolymer surfactant incorporated in the colorant composition is from 0.5 to 16, preferably from 1 to 12, and more preferably from 2 to 8, weight percent based on the total amount of solids in the colorant composition.

In certain good embodiments, the one or more acrylic monomers, vinyl monomers and/or styrenic monomers are present in the polymerization process at a concentration of from about 10% to about 90% by weight, preferably from about 10% to about 60% by weight, based on the total weight of all monomers and chain transfer agent(s) from which the copolymer is formed.

In one embodiment, where the surfactant monomer is selected from nonylpoly (ethyleneoxy) acrylate, decylpoly (ethyleneoxy) acrylate, undecylpoly (ethyleneoxy) acrylate, oleylpoly (ethyleneoxy)methacrylate, behenylpoly (ethyleneoxy)methacrylate, tristyrylphenylpoly (ethyleneoxy) methacrylate, or a mixture thereof, copolymer is formed from an amount of surfactant monomer(s) is from about 0.5% to about 13% by weight, based on the total weight of all monomers and chain transfer agent(s) from which the copolymer is formed.

The colorant composition can further comprise at least one associative thickener.

The colorant composition can also comprise low molecular weight polymer glycols. Suitable ones include polyethylene glycol, polypropylene glycol and the like with a number average molecular weight of about 300-about 8,000 Daltons. These substances can affect the drying properties of colorant compositions of the invention. At least one of these low molecular weight polymer glycols can be present in colorant compositions of the invention, but their use is optional.

The copolymer surfactants of the invention can also be used in combination with other water-soluble polymers, including but not limited to polycarboxylic acids, copolymers comprising monomers containing a carboxylic acid, water soluble copolymers, cellulose derivatives, salts of polyacrylic acids, salts of copolymers comprising monomers containing an acrylic acid, polyvinylpyrrolidone, and copolymers comprising vinylpyrrolidone monomer. In another embodiment, the water-soluble polymer is a salt of a polyacrylic acid, a salt of a copolymer comprising a monomer containing an acrylic acid, or a mixture thereof. Conventional emulsifiers or surfactants, i.e., anionic, cationic, nonionic, amphoteric surfactants and mixtures thereof, can also be used with the copolymer surfactants of the invention.

Exemplary associative thickeners include nonionic hydrophobically modified ethylene oxide urethane block copolymers, hydrophobically-modified polyethers, hydrophobically-modified alkali soluble emulsions, hydrophobically-modified poly(meth)acrylic acid, hydrophobically-modified hydroxyethyl cellulose, hydrophobically-modified poly (acrylamide), and mixtures thereof.

In certain good embodiments of the invention the copolymer surfactant consists essentially of (a) from about 10% to about 80% by weight of methacrylic or acrylic acid, (b) from about 10% to about 80% by weight of a first vinyl ester which is alkyl methacrylate, the alkyl of which is of from 2 to 12 carbon atoms, and a second vinyl ester of from 2 to 12 carbon atoms, and (c) from about 0.01% to about 20% by weight of at least one surfactant monomer, wherein each the surfactant monomer is either an acrylic or methacrylic ester moiety joined with a hydrophobic moiety which is tristyrylphenyl by a bridging group consisting essentially of a poly(ethyleneoxy).

In further embodiment, the copolymer surfactant may comprise the following monomers:

(a) from about 10% to about 80% by weight of methacrylic or acrylic acid, (b) from about 10% to about 80% by weight of ethyl methacrylate and vinyl acetate, and (c) from about 0.01% to about 20% by weight tristyrylphenylpoly (ethyleneoxy)methacrylate.

As such, the surfactant monomer may be an acrylic or methacrylic ester moiety joined with a hydrophobic moiety selected from the group consisting of monostyrylphenyl, distyrylphenyl and tristyrylphenyl by a bridging group consisting essentially of a poly(ethyleneoxy) moiety. For example, the poly(ethyleneoxy) moiety has from about 4 to about 200 ethyleneoxy units.

The copolymer surfactants can be prepared by solution copolymerization of the monomers through free-radical, stable free-radical (e.g., using the well-known compound TEMPO), anionic or cationic polymerization in a solvent, such as an oxygenated solvent, or in a mixture of solvents. Glycols are exemplary oxygenated solvents. Exemplary glycols include ethylene glycol, propylene glycol, glycerol, diethylene glycol, triethylene glycol, tetraethylene glycol, and other polyethylene glycols of relatively low number average molecular weight, e.g., about 300-about 8,000 Daltons. Cellosolves and cellosolve derivatives, such as cellosolve acetate, can also be used as the oxygenated solvent.

In another embodiment, the copolymer surfactants are prepared by emulsion copolymerization of the monomers in a continuous aqueous phase emulsion using an emulsifier. This can be done by conventional emulsion polymerization at a pH below about 5.0 using a conventional free-radical producing initiator(s), such as ammonium persulfate, sodium persulfate, potassium persulfate, cumene hydroperoxide, tert-butyl hydroperoxide, benzoyl peroxide, acetyl peroxide, lauroyl peroxide, peracetic acid, perbenzoic acid and/or 2,2'-azobisisobutyronitrile. The amount of initiator used can be from about 0.05% to about 3.5% by weight based on total weight of all monomers present, preferably about 0.75% to about 3.2% by weight based on total weight of all monomers present. Polymerization is often carried out under a relatively inert atmosphere, such as is provided by nitrogen or argon gas, at a temperature of from about 60° C. to about 90° C. Of course, as known to one skilled in the art, greater or lesser amounts of initiator and higher or lower temperatures can be used depending on the circumstances. The polymerization can be carried out in a batch-wise or step-wise manner or with continuous addition of monomers in a conventional manner. The surfactant monomers can be fed simultaneously with other monomers, or be fed after a proportion of other monomers has been reacted.

Customarily, at least one anionic, cationic, nonionic or amphoteric emulsifier is used in the emulsion copolymerization in which the copolymer surfactant is prepared. When more than one emulsifier is present, each additional emulsifier may be designated a co-emulsifier. A wide variety of emulsifiers are available, for example, many are listed in McCutcheon's Emulsifiers & Detergents, North American Ed., Manufacturing Confectioner Pub. Co., Glen Rock. N.J., 1988, pp. 1-217. The emulsifier can be nonionic, have an anionic charge, have a cationic charge, or have both an anionic and a cationic charge, e.g., an amphoteric emulsifier, where each charge has associated with it a suitable counter ion; numerous examples of each are known in the art. See Lynn, Jr. et al., "Surfactants" in Kirk-Othmer Encyc. of Chem. Technol., 4th Ed., John Wiley & Sons, New York, 1997, Vol. 23, pp. 483-541.

Commonly utilized nonionic emulsifiers are alkylphenol ethoxylates and derivatives thereof, such as nonylphenol ethoxylate. Of course, copolymer surfactants made using such emulsifiers need to be "cleared" as not containing unduly large amounts of APEs or derivatives of same as a result of their production process.

Anionic emulsifiers include but are not limited to alkali metal alkyl aryl sulfonates, alkali metal alkyl sulfates, the sulfonated alkyl esters, e.g., sodium dodecylbenzene sulfonate, sodium disecondary-butylnaphthalene sulfonate, sodium lauryl sulfate, disodium dodecyldiphenyl ether disulfonate, disodium n-octadecylsulfosuccinamate, sodium dioctylsulfosuccinate, and the like. Cationic emulsifiers include but are not limited to amines, e.g., aliphatic mono-, di- and polyamines derived from fatty and rosin acids; and quaternary ammonium salts, e.g., dialkyldimethyl and alkyltrimethyl ammonium salts, alkylbenzyldimethyl ammonium chlorides, and alkylpyridinium halides.

Amphoteric emulsifiers include but are not limited to imidazoline derivatives, such as disodium lauroampho diacetate, disodium cocoampho diacetate, sodium cocoampho acetate, sodium cocoampho propionate, sodium lauroampho acetate, disodium cocoampho dipropionate, cocoampho dipropionic acid, sodium capryloampho carboxylate, sodium cocoampho hydroxypropyl sulfonate, sodium capryloampho hydroxypropyl sulfonate, and the like; alkyl betaines, such as lauramidopropyl betaines, coco dimethyl betaine, oleamidopropyl betaine, and the like; sultaines, such as alkylether hydroxypropyl sultaine, cocamidopropyl hydroxyl sultaine, and the like; dihydroxyethyl glycinates, such as dihydroxyethyl tallow glycinate and the like; and aminopropionates, such as sodium laurimino dipropionate and the like. The foregoing emulsifiers can be separately or as a mixture of two or more thereof.

When a copolymer surfactant is prepared by emulsion polymerization, the amount of emulsifier used can be from about 0.2% to about 10% by weight based on the total weight of the emulsion, preferably from about 0.5% to about 10% by weight based on the total weight of the emulsion, more preferably from about 0.5% to about 4.0% by weight based on the total weight of the emulsion.

A copolymer surfactant typically has a number average molecular weight of from about 400 Daltons to about 500,000 Daltons, preferably from about 400 to about 200.000 Daltons, more preferably from about 1,200 to about 200,000 Daltons.

One interesting type of copolymer surfactant comprises component units derived from one or more members of the group consisting of acrylic monomers, vinyl monomers and styrenic monomers; component units derived from one or more members of the group consisting of carboxylic acid monomers and anhydride monomers, each of which has an unsaturated bond capable of entering into a polymerization reaction, one or more component units corresponding to a surfactant monomer; component units corresponding to one or more chain transfer agents; and component units corresponding to one or more crosslinking monomers, each of which crosslinking monomers has at least three unsaturated bonds capable of entering into a polymerization reaction, is provided.

These copolymer surfactants typically have a multi-branched structure with a degree of branching which is the result of the presence in the copolymer of component units corresponding to a crosslinking monomer having at least three unsaturated bonds capable of entering into a polymerization reaction, and the interplay between such units and the chain transfer agent(s) which reacts with propagating branches so as to terminate their growth with the result that new branches form at different sizes provided by the component corresponding to the crosslinking monomer.

Correlatively, the expression "hyperbranched copolymer" means a copolymer with one or more constituent component unit(s) corresponding to a crosslinking monomer having at least three unsaturated bonds capable of entering into a polymerization reaction.

One or more chain transfer agents are used to effect "hyperbranching" of the copolymers of the invention. Chain transfer agents useful in preparing hyperbranched copolymers of the invention include linear or branched $C_4$-$C_{22}$ alkyl mercaptans (such as n-dodecyl mercaptan and t-dodecyl mercaptan), isopropanol, halogenated compounds, n-butyl mercaptan, n-amyl mercaptan, i-octyl 2-mercaptopropionate, alkyl thioglycolate, mercaptoproprionic acid and alkyl mercaptoalkanoate. More specifically, when incorporated into a growing branch of the copolymer, chain transfer agents terminate extension of that branch. As discussed later, the use of crosslinking monomer(s) results in hyperbranching where many branches form and grow in length. These branches propagate at the numerous branch points available. This gives rise to an unusually large number of branches. In order to regulate the molecular weight of the hyperbranched copolymer, a chain transfer agent, or combination of multiple agents is utilized to react with the component unit at the end of the branch, to terminate growth of the branches before they increase in size to the length which would otherwise be attained in their absence, thereby providing a ceiling on the molecular weight. Thus, the molecular weight of the hyperbranched copolymer can be regulated by altering the amount of chain transfer agent used in embodiments of the present invention.

In various good embodiments, one or more a chain transfer agents are present in an amount of about 0.02% to about 8% by weight, and more preferably in an amount of about 1% to about 3% by weight, of the total amount of monomers and chain transfer agent(s) from which the hyperbranched copolymer is formed.

Furthermore, the copolymer of the invention also comprises copolymer units corresponding respectively to one or more crosslinking monomers. Incorporation of these units has the effect of contributing to modification of the molecular weight of and promoting enhanced the branching of the copolymers of the invention.

Crosslinking monomers suitable for practice of the invention have multiple, and in any event at least two reactive unsaturated, preferably ethylenically unsaturated, bonds in a single molecule. In certain good embodiments of the invention, the crosslinking monomer(s) used has at least three reactive ethylenically unsaturated bonds in a single molecule. Such compounds are referred to as "multifunctional crosslinking monomers." Component units corresponding to one or more multifunctional crosslinking monomers are, for example, units corresponding to one and only one multifunctional crosslinking monomer, or alternatively, units corresponding to one or another of multiple different multifunctional crosslinking monomers that all are used in the polymerization reaction, to yield the increased amount of branching sought.

Examples of the foregoing are component units corresponding to multi-functional crosslinking monomers such as trimethylolpropane triacrylate, ethoxylated trimethlolpropane triacrylate, propoxylated trimethylolpropane triacrylate, propoxylated glyceryl triacrylate, pentaerythritol triacrylate, tris(2-hydroxy ethyl) isocyanurate triacrylate, ditrimethylolpropane tetraacrylate, pentaerythritol tetraacrylate, ethoxylated pentaerythritol tetraacrylate, pentaacrylate ester and dipentaerythritol pentaacrylate.

Frequently, unsaturated crosslinking monomer is present in an amount from about 0.5% to about 70%, preferably from about 0.5% to about 10%, more preferably from about 0.5% to about 5% by weight, of the monomers and chain transfer agent(s) from which the copolymer is formed (though those of ordinary skill, equipped with the teachings herein, will be able to determine, as a matter of routine experimentation, instances in which greater or lesser amounts can sometimes suffice without the exercise of inventive skill).

Each component unit corresponding to multifunctional crosslinking monomer in a polymer chain serves as a branch point, from which a branch structure can propagate. As the amount (given above) of multifunctional crosslinking monomer used in the polymerization reactions is increased, and thus the amount of corresponding component units in the copolymer is increased, more branching occurs and the molecular weight of the hyperbranched copolymer is increased. It follows that the amount of branching can be regulated by altering the amount of multifunctional crosslinking monomer used in embodiments of the present invention while, as discussed hereinabove, the average size of the branches is controlled by altering the amount of chain transfer agent.

Paints and Other Coatings

The paints and other coatings of the invention are all essentially aqueous dispersions of polymeric materials containing one or more pigments to achieve a desired color, and (optionally) additions to facilitate pigment dispersion, good rheology, and other desired features. Of course, the scope and nature of aqueous latex paints for both architectural and industrial use, indoors and outdoors, are familiar to and well understood by those of skill in the art. However, our invention applies not only to such paints, but also to other aqueous dispersions referred to as water-borne coatings. These can be architectural or industrial stains, industrial maintenance coatings and the like. The paints and other coatings we have invented can be utilized in decorative, architectural, industrial and other conventional applications. Irrespective of the use to which they are put, our innovative paints and other coatings have in common that they are all subject to improvement through practice of the invention.

The aqueous latex paints and other water-borne coatings, including the resultant films, because they are made with colorant compositions of the invention, contain copolymer surfactants as discussed previously. These paints and coatings, along with aqueous dispersions such as tint bases, also contain surfactants and/or dispersants, and optionally one or more water-dispersible polymers, one or more low number average molecular weight polymers (such as polyethylene glycol or polypropylene glycol) each with an average molecular weight below about 300-about 8,000 Daltons, and one or more rheology modifiers, for instance thickeners, especially associative thickeners. (It goes almost without saying that the latex paint, other water-borne coating, tint base, film, etc. contain a film-forming latex binder component in amount sufficient for the formation of a suitable paint film, its being understood that the film-forming binder latex in a film embodiment can be in the cured "film" state.)

The inventive paint or other water-borne coating, comprising a tint base and a colorant composition of the invention, contains a copolymer surfactant which is compatible with a wide range of film-forming additives conventionally incorporated in latex paints and water-borne coatings, as specified hereinbefore. When so incorporated, the copolymer surfactants cause the water-based paint or other water-borne coating to exhibit appropriate low or middle shear viscosity with improved flow and leveling. The ordinarily skilled worker, equipped with the teachings herein, will be able to determine, as a matter of routine investigation, and without undue experimentation, amounts of copolymer surfactant which are effective to confer appropriate low or middle shear viscosity with improved flow and leveling on the paint or other coating. In certain good embodiments of the invention, the amount of copolymer incorporated in the paint or other coating is from 0.1 to 20, preferably from 1 to 15 and more preferably from 2 to 10, weight % based on the total amount of polymer solids in the paint or other coating.

The copolymer surfactant utilized in practicing the invention is compatible with the full range of film-forming polymers conventionally utilized in the coating field. Examples of film-forming emulsion polymers which are suitable for use in the invention are acrylic, vinyl, polyvinyl acetate, vinyl acrylic, styrenic, and styrenated acrylic polymers, among others. The film-forming polymer varies by the intended application and a person of ordinary skill in the art will be able to determine, as a matter of routine testing and without under experimentation, which film-forming polymer to use for a particular application. When combined as a part of a colorant composition with film-forming polymer(s) in a tint base, or other aqueous dispersion, the copolymer surfactant causes the tint base/colorant composition combination to exhibit desired low or middle shear viscosity (Kreb units—unit amounts depending upon the desired characteristics of a particular formulation) with improved flow and leveling.

Once in possession of the teachings herein, those of ordinary skill in the art will be able to determine, as a matter of routine testing and without under experimentation, amounts of copolymer surfactant which are effective to confer appropriate low or middle shear viscosity with improved flow and leveling on the tint base or other aqueous dispersion. In certain good embodiments of the invention, the amount of copolymer surfactant incorporated in the tint base or other aqueous dispersion is from 0.1 to 25, preferably from 1 to 20, and more preferably from 2 to 15 weight % based on the total amount of polymer solids in the tint base or other aqueous dispersion.

Methods

The method of forming a colorant composition in accordance with the invention preferably comprises combining the components water, at least one pigment and a copolymer surfactant, the copolymer surfactant comprising moieties corresponding to the following monomers (a) from about 10% to about 80% by weight of at least one $C_3$-$C_{12}$ α,β-ethylenically unsaturated carboxylic acid or anhydride, (b) from about 10% to about 80% by weight of at least one $C_3$-$C_{12}$ α,β-ethylenically unsaturated vinyl monomer, and (c) from about 0.01% to about 20% by weight of at least one surfactant monomer, wherein each said surfactant monomer is either an acrylic or methacrylic ester moiety joined with a hydrophobic moiety by a bridging group consisting essentially of a poly(ethyleneoxy) moiety, to form a colorant composition which is not itself an aqueous latex paint or other water-borne coating, which colorant composition is capable of mitigating any change in the Stormer low-shear viscosity of an aqueous latex paint or other water-borne coating formed of a mixture comprising said composition and a tint base, such that said Stormer low-shear viscosity of said paint or coating is not substantially changed compared with the Stormer low-shear viscosity of the tint base, and in which colorant composition any VNCs are present in an amount no greater than 1000 ppm by weight, any APEs or derivatives thereof are present in an amount no greater than 1000 ppm by weight, any crystalline silica is present in an amount no greater than 100 ppm by weight, and any formaldehyde is present in an amount no greater than 10 ppm by weight.

The method of forming an aqueous latex paint or other water-borne coating in accordance with the invention preferably comprises mixing a tint base as previously described, with a colorant composition containing at least one pigment, water and a copolymer surfactant, which copolymer surfactant comprises moieties corresponding to the following monomers:

(a) from about 10% to about 80% by weight of at least one $C_3$-$C_{12}$ α,β-ethylenically unsaturated carboxylic acid or anhydride, (b) from about 10% to about 80% by weight of at least one $C_2$-$C_{12}$ α,β-ethylenically unsaturated vinyl monomer, and (c) from about 0.01% to about 20% by weight of at least one surfactant monomer, wherein each said surfactant monomer is either an acrylic or methacrylic ester moiety joined with a hydrophobic moiety by a bridging group consisting essentially of a poly(ethyleneoxy) moiety, the Stormer low-shear viscosity of said paint or other water-borne coating, its formation by mixing of the colorant composition with the tint base notwithstanding, being not substantially changed compared with the Stormer low-shear viscosity of the tint base, and in which paint or other coating any volatile organic compounds are present in an amount no greater than 500 ppm by weight, any alkylphenol ethoxylates are present in an amount no greater than 300 ppm by weight, any crystalline silica is present in an amount no greater than 100 ppm by weight, and any formaldehyde is present in an amount no greater than 10 ppm by weight.

EXAMPLES

The following examples further illustrate certain embodiments of the present invention. These examples are provided solely for illustrative purposes and in no way limit the scope of the present invention. It is noted that, because of rounding, the sum of the amounts of each ingredient present may not equal the total in every case.

Examples 1-3 are directed to preparation of APE-free copolymer surfactants utilizing the basic procedures and conditions reported in the Examples 1-8 of U.S. Pat. No. 7,402,627 which is hereby incorporated by reference in its entirety.

Example 1

Preparation of Copolymer Surfactant Free of APE

The emulsion polymerization was carried out in a four-neck flask under nitrogen purge. The reaction flask was equipped with a condenser, a thermometer, an agitator and a feeding pump. The flask was immersed in a temperature controlled water bath maintained at a constant temperature within about ±0.1° C. of the set point. Table 1 shows the ingredients used for the copolymer surfactant.

TABLE 1

Ingredients for Preparation of Copolymer Surfactant (1)

| Component | Parts (by weight) |
|---|---|
| Initial Charge in Reactor | |
| Deionized water | 48.5 |
| Sodium dodecyl benzene sulfonate (22% w/w) | 0.3 |
| Monomer Emulsion | |
| Deionized water | 17.3 |
| Sodium dodecyl benzene sulfonate (22%) | 0.7 |
| Methacrylic acid | 11.6 |
| Vinyl acetate | 13.9 |
| Butyl acrylate | 4.2 |
| Tristyrylphenylpoly(ethyleneoxy) methacrylate (60%) | 0.4 |
| Diallyl phthalate | 0.03 |
| Initiator Solution 1 | |
| Sodium persulfate | 0.15 |
| Deionized water | 1.4 |
| Initiator Solution 2 | |
| Sodium persulfate | 0.15 |
| Deionized water | 1.4 |
| Total | 100 |

Deionized water and sodium dodecyl benzene sultanate (22% w/w) obtained from Rhodia Inc. (Cranbury, N.J.) were charged into the reaction flask and its contents were heated to 80° C. At 80° C., about 6% of monomer emulsion was charged into the reaction flask and held for 5 minutes. Thereafter, initiator solution 1 was charged into the reaction flask and held for 15 minutes. Initiator solution 2 and the remaining monomer emulsion were then fed into the reaction flask over a period of from about 3 to about 4.5 hours. After feeding was complete, the temperature of the reaction flask was maintained at 80-85° C. for one hour after which it was cooled to about 25° C., and the copolymer surfactant product, in the form of a latex or emulsion, was recovered, with a solids content of about 30%.

This copolymer surfactant contained a hydrophobe surfactant monomer, tristyrylphenylpoly(ethyleneoxy)methacrylate, and a crosslinking monomer, diallyl phthalate.

Example 2

Preparation of Copolymer Surfactant (2)

The reactant composition was the same as in Example 3 of U.S. Pat. No. 7,402,627, except ammonium nonylphenyl ether persulfate, an APE surfactant, was replaced with an APE-free surfactant, sodium tridecyl ethoxy sulfate (RHODAPEX EST-30 from Rhodia Inc.), as shown in Table 2.

The same procedures and conditions as in Example 1 were used.

TABLE 2

Ingredients for Preparation of Copolymer Surfactant (2)

| Component | Parts (by weight) |
|---|---|
| Initial Charge in Reactor | |
| Deionized water | 49.4 |
| Sodium tridecyl ethoxy sulfate (30% w/w) | 0.1 |
| Monomer Emulsion | |
| Deionized water | 13.9 |
| Sodium tridecyl ethoxy sulfate (30%) | 0.8 |
| Abex 2020 | 1.2 |
| Methacrylic acid | 9.8 |
| Vinyl acetate | 9.8 |
| Ethyl methacrylate | 9.8 |
| Tristyrylphenylpoly(ethyleneoxy) methacrylate (60%) | 1 |
| Initiator Solution 1 | |
| Ammonium persulfate | 0.03 |
| Deionized water | 1.3 |
| Initiator Solution 2 | |
| Deionized water | 2 |
| Sodium tridecyl ethoxy sulfate (30%) | 0.5 |
| Abex 2020 | 0.4 |
| Ammonium persulfate | 0.04 |
| Rinse Deionized water | 0.9 |
| Total | 100 |

The surfactant ABEX 2020 was a proprietary formulation obtained from Rhodia Inc. It is believed to comprise a mixture of an anionic surfactant and a nonionic surfactant. The copolymer surfactant product, in the form of a latex or emulsion, was recovered, with a solids content of about 30%.

Example 3

Preparation of Copolymer Surfactant Free of APE

The monomer composition was the same as in Example 4 of U.S. Pat. No. 7,402,627, except a di-functional monomer, diacrylate (Sartomer SR610), was used as a crosslinking monomer. Ammonium nonylphenyl ether persulfate (APE surfactant) and Abex 2020, per Example 4 of U.S. Pat. No. 7,402,627, were replaced with sodium dodecyl benzene sulfonate (22% w/w) and RHODA FAC RS-610A-25 (polyoxyethylene tridecyl etherphosphate, Rhodia Inc.).

The same procedures and conditions as for Example 1 were used in preparing the copolymer surfactant. Thus, after monomer feeding was complete, the temperature of the reaction flask was maintained at 80-85° C. for one hour. The reactor was then cooled to 60-65° C. and chaser mixtures were fed to the reactor over 30 minutes. It was then cooled to room temperature. The copolymer surfactant product, in the form of a latex or emulsion, was recovered, with a solids content of about 30%.

TABLE 3

Ingredients for Preparation of Copolymer Surfactant (3)

| Component | Parts (by weight) |
|---|---|
| Initial Charge in Reactor | |
| Deionized water | 47.6 |
| Sodium dodecyl benzene sulfonate (22%) | 0.1 |
| Monomer Emulsion | |
| Deionized water | 13.5 |
| Sodium dodecyl benzene sulfonate (22%) | 1.2 |
| RHODAFAC RS-610A-25 | 1.0 |
| Methacrylic acid | 9.33 |
| Vinyl acetate | 9.33 |
| Ethyl methacrylate | 9.33 |
| Behenylpoly(ethyleneoxy) methacrylate (50%) | 2.4 |
| Diacrylate (SR610) | 0.3 |
| Initiator Solution 1 | |
| Ammonium persulfate | 0.03 |
| Deionized water | 1.3 |
| Initiator Solution 2 | |
| Deionized water | 1.9 |
| Sodium dodecyl benzene sulfonate (22%) | 0.6 |
| RHODAFAC RS-610A-25 | 0.4 |
| Ammonium persulfate | 0.04 |
| Rinse Deionized water | 0.9 |
| Chaser Solution | |
| Oxidizing solution | |
| Deionized water | 0.4 |
| t-butylperoxide | 0.06 |
| Reducing solution | |
| Deionized water | 0.4 |
| BRUGGOLITE FF^ M (Bruggmann Chem.) | 0.04 |
| Rinse deionized water | 0.7 |
| Total | 100 |

The copolymer of Example 3 contains a hydrophobe monomer of behenylpoly (ethyleneoxy)methacrylate.

Example 4

Colorant Composition Containing a Red Oxide Pigment

A colorant composition comprising a red oxide pigment and a copolymer surfactant of Example 2 was prepared. Table 4 shows the ingredients used in the red oxide colorant composition.

The colorant composition was prepared as follows. To a 1 L stainless steel beaker, equipped with a stirrer that stirred under slow agitation at about 500 rpm, was added in the following order: water, copolymer surfactant emulsion from Example 2 and sodium hydroxide solution. When the solution became clear, the remaining ingredients were added in the order set forth in Table 4 (top to bottom), and mixing continued at about 500 rpm for 10 minutes. The mixing speed was increased to about 2,500 rpm and mixing continued for about 45 minutes at that speed until the mixture appeared to be a homogenous dispersion. Carbowax PEG 400 is a solvent of polyethylene glycol with a number average molecular weight of about 400 Daltons. It does not contain VNCs. Proxel BZ Plus is a preservative free from formaldehyde from Arch Chemical. BYK-155 is a non-APE dispersant from BYK Chemie. Tego Dispers 750W is an APE-free dispersant from Evonik Inc.

The red oxide color composition did not contain APEs, formaldehyde and crystalline silica. It did not contain appreciable VOC amounts, but rather had a very low VOC content of 82 ppm, mostly from impurities due to additives.

TABLE 4

Ingredients for Preparation of Colorant Composition of Red Oxide

| Component | Parts (by weight) |
|---|---|
| Water | 427 |
| APE free copolymer surfactant of Example 2 | 25 |
| Sodium hydroxide 50% (W/W) | 4.5 |
| Carbowax PEG 400 | 80 |
| PROXEL BZ PLUS (preservative) | 2.5 |
| BYK-155 (dispersant, BYK Chemie) | 80 |
| TEGO DISPERS 750W (dispersant) | 30 |
| Red oxide R-2199D (Rockwood) | 800 |
| HI-MAR DFC-10 Deformer | 10.7 |
| Styrene acrylic latex (45%) | 50 |
| Total | 1509 |

Example 5

Colorant Composition of Organic Yellow Pigment

A colorant composition comprising an organic yellow pigment and a copolymer surfactant of Example 2 was prepared. It was made with ingredients free of APEs, formaldehyde, and crystalline silica. It did not contain appreciable VOC amounts. The colorant composition was prepared with the same procedures for grinding as in Example 4. After grinding at 2500 rpm for 45 minutes, the mixture was then processed through a sand mill (Model L-3-J, Chicago Boiler Co., Buffalo Grove, Ill.) using 1.00 mm diameter glass beads as the grinding media.

Example 6

Colorant Composition of Organic Green Pigment

A colorant composition comprising an organic green pigment and a copolymer surfactant of Example 2 was prepared. It was made with ingredients free of APEs, formaldehyde and crystalline silica. It did not contain appreciable VOC amounts. The colorant was prepared according to the same procedures as in Example 5.

Example 7

Colorant Composition of Organic Blue Pigment

A colorant composition comprising an organic blue pigment and a copolymer surfactant of Example 2 was prepared. It was made with ingredients free of APEs, formaldehyde and crystalline silica. It did not contain appreciable VOC amounts. The colorant was prepared according to the same procedures as in Example 5.

Example 8

VOC-Content of Colorant Compositions for Examples 4-7

Preliminarily, VOCs were measured by headspace Gas Chromatography/Mass Spectroscopy. This test method is for determining the weight amount of individual VNCs in an aqueous latex paint or other water-borne coating. It can be conducted using a commercially available capillary gas chromatograph equipped with a mass selectivity detector and programming capability (electronic flow control is helpful). Here, an Agilent 6890 N gas chromatograph, an Agilent 5973 mass selectivity detector, and an Agilent 7694E headspace sampler were utilized. Standard instrument conditions for testing were

| | |
|---|---|
| Detector | Mass Selectivity |
| Column | 100% polyethylene glycol (Phenomenex ZB-Wax), 30 meters length, 0.25 mm I.D., 0.25 μm film thickness |
| Carrier Gas | Helium |
| Pressure | 13.3 |
| Flow Rate | 1.0 mL per min. constant flow (38 cm/s) |
| Split Ratio | 50 |
| Split Flow | 49.9 |
| Total Flow | 53.5 |
| Inlet Temp. | 270° C. |
| Detector Temp. | 280° C. |
| MS Source Temp. | 230° C. |
| MS Quad Temp. | 150° C. |
| GC Oven Parameters. | 50° C. initial. Hold @ 50° C. for 1 minute then ramp to 250° C. @ 15° C./minute. Hold @ 250° C. for 15 minutes. |
| Headspace Vial Size | 10 mL |
| Headspace Sample Size | 0.0500 ± 0.0010 g |
| Headspace Temp. | 120° C. equilibrated for 15 minutes |
| Transfer Line Temp. | 140° C. |
| Loop Temp. | 130° C. |

Ultra high purity grade carrier gas was employed along with reagent grade chemicals.

The test protocol is as follows: 50 ppm of each target substance for determination is added to each of two aliquots of the material to be analyzed (e.g., aqueous latex paint or colorant composition). Then, the target substance(s) are diluted to 25 ppm in one of the aliquots by adding to it a further and equal amount of the material to be analyzed. Thereafter, into a 10 mL headspace vial is introduced a 0.0500±0.0010 g amount of the material to be analyzed; into a separate 10 mL headspace vial is introduced a 0.0500±0.0010 g amount of such material along with the added target substance(s) at the 50 ppm concentration, and into yet another 10 mL headspace vial a 0.0500±0.0010 g amount of such material with added target substance(s) at the 25 ppm concentration. If there are numerous target substances, a plurality of headspace vials may be filled each with a 10 mL sample that contains a different (though not necessarily mutually exclusive) sub-group of target substances vis-à-vis the other samples (for each said sub-group there being one vial of material at the 50 ppm additive level, and another of material at the 25 ppm level). The target substances in the samples are separated via gas chromatography as mentioned previously; in conjunction with the foregoing, the characteristic mass of each targeted substance is identified and integrated, and approximate retention times and characteristic masses ascertained.

The area corresponding to target substance is divided by the area derived in an analogous determination corresponding to an internal standard (e.g., cyclohexane) to arrive at a response factor. Plotting response factor against added amount of the target substance on a Cartesian coordinate grid yields the amount of a targeted substance in the unknown sample, corresponding to the x-intercept of the plot.

The results are set forth in terms of parts of VOC per million parts of total sample (ppm) and percent by weight, and are presented in Table 5.

Example 9A

Comparative Examples VOC-Content of Commercial Color Compositions

The VOC contents of the following commercial low-VOC and ethylene-glycol-containing color compositions were measured using the method in Example 8 above (note: "VOC" refers to "volatile organic compounds" and is a more specific sub-group of VNC). The results are set forth in Table 5:

TABLE 5

| VOC of Colorants | | |
|---|---|---|
| Colorants | VOC (ppm) | % by weight |
| Experimental Low VOC Colorants A | | |
| Red Oxide of Example 4 | 82 | 0.0082 |
| Organic yellow of Example 5 | 292 | 0.0292 |
| Organic green of Example 6 | 147 | 0.0147 |
| Organic blue of Example 7 | 188 | 0.0188 |
| Commercial Low VOC Colorants B | | |
| Red Oxide | 267 | 0.0267 |
| Organic yellow | 114 | 0.0114 |
| Organic green | 362 | 0.0362 |
| Organic blue | 119 | 0.0119 |
| Commerical Low VOC Colorants C | | |
| Red Oxide | 570 | 0.0570 |
| Organic yellow | 1163 | 0.1163 |
| Organic green | 2626 | 0.2626 |
| Organic blue | 530 | 0.0530 |
| Commercial Low VOC Colorants D | | |
| Red Oxide | 92 | 0.0092 |
| Organic yellow | 2338 | 0.2338 |

TABLE 5-continued

| VOC of Colorants | | |
|---|---|---|
| Colorants | VOC (ppm) | % by weight |
| Organic green | 500 | 0.0500 |
| Organic blue | 797 | 0.0797 |
| Commercial Low VOC Colorants E | | |
| Red Oxide | 474 | 0.0474 |
| Organic yellow | 523 | 0.0523 |
| Organic green | 999 | 0.0999 |
| Organic blue | 440 | 0.0440 |
| Commercial Normal VOC Colorants F | | |
| Red Oxide | 208000 | 20.8% |
| Organic yellow | 104000 | 10.4% |
| Organic green | 311000 | 31.1% |
| Organic blue | 304000 | 30.4% |

Four commercial low VOC colorants were obtained and used for testing, labeled B, C, D and E. In addition, 1 regular commercial colorant (normal higher VOC) was also tested and labeled F. These colorants were tested using a Headspace GC at 120° C. for VOC's. The results were listed on Table 5 verses the experimental colorants.

Example 9B

A further analysis of VOC levels was carried out among a low-VOC tint base (Sample A), a phthalo-green-tinted aqueous latex paint of our invention (Sample B), various competitive low-VOC aqueous latex-paints (Samples C-E), and a competitive normal-VOC aqueous latex paint (Sample F). The aqueous latex-paints tested were prepared by adding a variety of green colorants to the same low-VOC tint base. The Sample B paint and corresponding colorant composition were prepared generally in accordance with the preceding disclosure of our invention. Following Table 6 details the VOC-level results obtained in testing the respective Samples pursuant to the Headspace Method described:

TABLE 6

| Headspace Comparison of Phthalo Green Tints | | | | | | |
|---|---|---|---|---|---|---|
| | Sample A | Sample B | Sample C | Sample D | Sample E | Sample F |
| | | | Base (Lot 942914) | | | |
| | Low VOC Eggshell | Low VOC Eggshell | Low VOC Eggshell | Low VOC Eggshell Tint | Low VOC Eggshell | Low VOC Eggshell |
| | None | Experimental A Low VOC Colorant | Competitive B Low VOC Colorant | Competitive C Low VOC Colorant | Competitive D Low VOC Colorant | Competitive Normal VOC Colorant |
| t-Butyl Alcohol | 113 | 84 | 84 | 81 | 76 | 64 |
| Isopropyl Alcohol | — | — | — | — | — | — |
| n-Butyl Ether | 5 | 27 | 22 | 4 | 24 | 3 |
| Butyl Propionate | 11 | 10 | 12 | 11 | 8 | — |
| Xylene(s) | — | 1 | — | 2 | — | 24 (2) |
| Aliphatic Blend(s)[1] | — | — | — | — | — | 88 (8) |
| Butyl Alcohol | 110 | 95 | 93 | 87 | 85 | 87 |
| Propylene Glycol[1] | — | — | — | — | — | 27 |
| Ethylene Glycol | 53 | 24 | 34 | 47 | 33 | 4,219 |

TABLE 6-continued

Headspace Comparison of Phthalo Green Tints

| | Sample A | Sample B | Sample C | Sample D | Sample E | Sample F |
|---|---|---|---|---|---|---|
| | | | | Base (Lot 942914) | | |
| | Low VOC Eggshell | Low VOC Eggshell | Low VOC Eggshell | Low VOC Eggshell Tint | Low VOC Eggshell | Low VOC Eggshell |
| | None | Experimental A Low VOC Colorant | Competitive B Low VOC Colorant | Competitive C Low VOC Colorant | Competitive D Low VOC Colorant | Competitive Normal VOC Colorant |
| Dodecanol | — | — | 13 | 10 | 8 | 17 |
| Texanol ® | — | — | — | 29 | — | — |
| Unknown(s)[-2] | — | 5 (2) | — | 8 | 4 (2) | — |
| Total (ppm) | 292 | 246 | 258 | 279 | 234 | 4,529 |

[-1]Quantified as toluene
[-2]Match quality under 70%, quantified as toluene

The results with a paint and colorant composition according to our invention are comparable to those with other low-VOC products, and much better than those with the normal-VOC product.

Example 10

Rheology of Paints Tinted with Colorant Compositions of Examples 4-7

The rheology of tint base paints, as indicated by properties such as viscosity, leveling, and sag resistance, is important to proper application and dry film appearance. Unfavorable rheology properties, such as low Stormer viscosity and low sag resistance, may lead to dripping or sagging when the paint is applied to a substrate. Poor leveling properties may result in brush marks.

The colorants of Examples 4-7 were individually added to a Low-VOC Commercial Matte Pastel Paint Tint Base, a Low-VOC Commercial Matte Deep Tint Base, and a Low-VOC Commercial Semigloss Deep Tint Base. Pastel bases had added to them 6 ounces of colorants, and deep bases had added to them 18 ounces of colorants. The paints were shaken with a mechanical shaker for 6 minutes for thorough mixing of the bases and colorant compositions.

The Stormer Viscosity in Krebs Units (KU) was determined according to ASTM Standard D562-01, "Standard Test Method for Consistency of Paints Measuring Krebs Unit (KU) Viscosity Using a Stormer-Type Viscometer," using a Brookfield Viscometer model KU-1 obtained from BYK-Gardner USA (Rivers Park II, Md.). The Stormer viscosity was measured at 25° C.

The change of KU upon adding of the colorants of Examples 4-7 is listed in Table 7. Satisfactory KU changes in a pastel base would typically be less 5 and in deep bases would typically be less than 10.

The leveling of paints was determined from draw-downs according to ASTM Standard D4062-99, "Standard Test Method for Leveling of Paints by Draw-Down Method." A Leneta Leveling Test Blade (LTB-2) and Leneta Draw-Down Charts (Form 18B), each obtained from the Leneta Company (Mahwah, N.J.), were used for these tests. The draw-downs were evaluated visually and assigned a rating of from 1 to 10 in comparison to a set of standards, as specified in ASTM D4062.

The leveling ratings of paints tinted with the colorants of Examples 4-7 are listed in Table 7. A leveling rating of 9 or greater is considered to be excellent.

Sag resistance was determined from Leneta draw-downs using a Leneta anti-sag meter. The paint was drawn down on a draw-down card positioned horizontally on a vacuum metal plate. The chart was then immediately placed in a vertical position with the paint stripes horizontal and left edge (thinnest stripe) at the top, and allowed to dry. Each stripe, ranging in wet film thickness from 3 to 12 mils, is considered as having the same rating number as the notch by which it has been applied. The highest number (thickest) stripe that does not touch the one below itself is referred to as the index stripe, and its number is the Anti-Sag index of the paint. The Sag resistance index values of paints tinted with the colorants of Examples 4-7 are listed in Table 7.

Example 11

Comparative Examples of Rheology of Tint-Base Paints with Commercial Colorants

A Low-VOC Commercial Matte Pastel Paint Tint Base Matte Deep Tint Base, and A Low-VOC Commercial Semigloss Deep Tint. Base were tinted with the colorants of Example 9A. The same amounts of colorants were added to the bases as in Example 10.

Stormer Viscosity change, leveling of paints, and sag resistance were determined with the same methods as in Example 10. The results are listed in Table 7.

TABLE 7

Stormer viscosity change (ΔKU), leveling, sag resistance of paints tinted with colorants

| Colorants | Matte Pastel Base | | | Matte Deep Base | | | Semigloss Deep Base | | |
|---|---|---|---|---|---|---|---|---|---|
| | ΔKU | Leveling | Sag | ΔKU | Leveling | Sag | ΔKU | Leveling | Sag |
| Red oxide of Example 4 | −5 | 9 | 12 | −4 | 10 | 12 | −2 | 10 | 11 |
| Org. Yellow of Example 5 | +2 | 9 | 10 | −7 | 10 | 8 | −4 | 10 | 8 |
| Org. Green of Example 6 | −2 | 9 | 12 | −8 | 10 | 12 | −1 | 10 | 12 |
| Org. Blue of Example 7 | 0 | 9 | 12 | 0 | 8 | 12 | 4 | 9 | 12 |
| Comparative Examples | | | | | | | | | |
| Red oxide of B | −14 | 9 | 12 | −27 | 10 | 7 | −20 | 10 | 6 |
| Org. Yellow of B | −14 | 9 | 12 | −27 | 10 | 7 | −23 | 10 | 6 |
| Org. Green of B | −15 | 9 | 12 | −27 | 10 | 7 | −22 | 10 | 7 |
| Org. Blue of B | −13 | 9 | 12 | −26 | 10 | 8 | −22 | 10 | 8 |
| Red oxide of C | −12 | 9 | 12 | −35 | 10 | 7 | −27 | 10 | 7 |
| Org. Yellow of C | −15 | 9 | 12 | −34 | 10 | 4 | −28 | 10 | 7 |
| Org. Green of C | −12 | 9 | 12 | −23 | 9 | 7 | −22 | 10 | 5 |
| Org. Blue of C | −12 | 9 | 12 | −27 | 9 | 7 | −23 | 10 | 7 |
| Red oxide of D | −21 | 9 | 11 | −42 | 9 | 6 | −36 | 10 | 6 |
| Org. Yellow of D | −20 | 9 | 10 | −37 | 10 | 6 | −31 | 10 | 6 |
| Org. Green of D | −21 | 9 | 10 | −37 | 9 | 5 | −33 | 10 | 5 |
| Org. Blue of D | −26 | 9 | 10 | −44 | 10 | 6 | −39 | 9 | 6 |
| Red oxide of E | | | | −49 | 10 | 6 | | | |
| Org. Yellow of E | −19 | 9 | 9 | −43 | 10 | 5 | −36 | 10 | 6 |
| Org. Green of E | −13 | 9 | 10 | −21 | 90 | 7 | −20 | 10 | 7 |
| Ore. Blue of E | −4 | 9 | 12 | −3 | 10 | 12 | −2 | 10 | 12 |
| Red oxide of F | −14 | 9 | 10 | −27 | 10 | 4 | −20 | 10 | 4 |
| Org. yellow of F | −26 | 9 | 9 | −48 | 10 | 4 | −42 | 10 | 3 |
| Org. green of F | −30 | 9 | 8 | −50 | 10 | 4 | −42 | 10 | 3 |
| Org. blue of F | −24 | 9 | 9 | −43 | 10 | 5 | −41 | 10 | 5 |

Table 7 shows that colorants of Example 4-7 gave the least change in KU as compared to all other commercial colorants described in Example 9A, and have excellent leveling and sag resistance.

The comparative examples carried out with commercial colorants demonstrated significant decrease in KU in both pastel and deep bases, and a drop in sag in deep bases. Although the leveling properties in the comparative examples may have been good, that was due to much lower viscosity of the tinted paints.

Despite formulation to meet rigorous environmental sensitivities, the results with a paint and colorant composition according to our invention were either better than or at least comparable to other low- or normal-VOC products for each of the properties tested. This uniform excellence characterizing the invention was superior to the performance contour of the comparative products which in each case fell short in respect of at least one property.

Example 12

Water Sensitivity, Color Transfer and Gloss of Tinted Paints in Example 10

Water sensitivity and gloss were measured on 3-mil draw downs dried for one day.

Water sensitivity was tested with a few drops of water on the paint surface for a minute. The water was wiped off and wetted surface was scratched with finger nails to check the hardness of the film. The rating is from 1 to 5, with 5 being the hardest film, indicating its being least water sensitive.

Gloss was measured on Commercial Semigloss deep tint bases with a BYK gloss meter at 65 degrees.

Color transfer (or color rub-off) for paints tinted with colorants of red oxide and organic blue were measured on 3-mil draw downs dried for 7 days. A rating of 1 to 5 was assigned, with 5 being the best resistance to color transfer.

The results of water sensitivity, color transfer and gloss are listed in Table 8.

Example 13

Comparative Examples of Water Sensitivity, Color Transfer and Gloss

Water sensitivity, color transfer and gloss were measured with the same methods as in Example 12 for paints tinted with commercial colorants in Example 11. The results are listed in Table 8.

TABLE 8

Water Sensitivity, Color Transfer and Gloss

| | Commercial Matte Deep Base | | Commercial Semigloss Deep Base | | |
|---|---|---|---|---|---|
| Colorants | Water Sensitivity | Color transfer | Water Sensitivity | Color transfer | Gloss |
| Red oxide of Example 4 | 4 | 3 | 1 | 5 | 54 |
| Org. Yellow of Example 5 | 3.5 | | 5 | | 64 |
| Org. Green of Example 6 | 3 | | 4.5 | | 62 |

TABLE 8-continued

Water Sensitivity, Color Transfer and Gloss

| Colorants | Commerical Matte Deep Base | | Commercial Semigloss Deep Base | | |
|---|---|---|---|---|---|
| | Water Sensitivity | Color transfer | Water Sensitivity | Color transfer | Gloss |
| Org. Blue of Example 7 | 4.5 | 3.5 | 5 | 5 | 62 |
| Red oxide of B | 1 | 1 | 1 | 2 | 58 |
| Org. Yellow of B | 4 | | 1 | | 57 |
| Org. Green of B | 1 | | 2 | | 60 |
| Org. Blue of B | 1.5 | 2 | 1 | 2 | 59 |
| Red oxide of C | 4 | 1 | 1 | 4.5 | 59 |
| Org. Yellow of C | 1.5 | | 3 | | 57 |
| Org. Green of C | 1 | | 1 | | 65 |
| Org. Blue of C | 3.5 | 2 | 4 | 3 | 60 |
| Red oxide of D | 2 | 1 | 4 | 4.5 | 53 |
| Org. Yellow of D | 1 | | 1 | | 39 |
| Org. Green of D | 1 | | 1 | | 41 |
| Org. Blue of D | 1 | 3 | 1 | 2 | 47 |
| Red oxide of E | 3.5 | 4 | n/a | n/a | n/a |
| Org. Yellow of E | 4.5 | | 5 | | 65 |
| Org. Green of E | 4.5 | | 4 | | 63 |
| Org. Blue of E | 5 | 3 | 5 | 4.5 | 60 |
| Red oxide of F | 3 | 3 | 1 | 4.5 | 45 |
| Org. yellow of F | 4 | | 1 | | 48 |
| Org. green of F | 4 | | 1 | | 41 |
| Org. blue of F | 4.5 | 2 | 1 | 2 | 45 |

As previously, the tabulated results show that, in contrast to the invention's uniform excellence, the performance contour of the comparative products in each case was no better than comparable to that of the invention. Since, when also taking into account the other properties assessed in preceding Examples, the comparative products all fall short in respect of at least one property, the invention is demonstrated to be superior.

The embodiments described herein are illustrative but not limiting in respect of the invention, and are not intended to exclude equivalents thereof, or to constrain the claims unduly.

The invention claimed is:

1. An aqueous latex paint or other water-borne coating comprising a tint base and a colorant composition, wherein the colorant composition is suitable as a precursor to an aqueous latex paint or other water-borne coating, which colorant composition comprises at least one color pigment, water, and a copolymer surfactant, which colorant composition is not itself the aqueous latex paint or other water-home coating, wherein the copolymer surfactant comprises moieties corresponding to the following monomers:
   (a) from about 10% to about 80% by weight of at least one $C_3$-$C_{12}$ α, β-ethylenically unsaturated carboxylic acid or anhydride,
   (b) from about 10% to about 80% by weight of at least one $C_2$-$C_{12}$ α, β-ethylenically unsaturated vinyl monomer, and
   (c) from about 0.01% to about 20% by weight of at least one surfactant monomer,
   wherein said surfactant monomer is either an acrylic or methacrylic ester moiety joined with a hydrophobic moiety by a bridging group comprising a poly(ethyleneoxy) moiety, and
   wherein the copolymer surfactant is attached to the at least one color pigment to form a plurality of color pigment composite particles.

2. The aqueous latex paint or other water-borne coating of claim 1, wherein any volatile non-aqueous constitutients in the colorant composition are present in an amount no greater than 1000 ppm by weight, any alkylphenol ethoxylates and derivatives thereof are present in an amount no greater than 1000 ppm by weight, any crystalline silica is present in an amount no greater than 100 ppm by weight, and any formaldehyde is present in an amount no greater than 10 ppm by weight.

3. The aqueous latex paint or other water-borne coating of claim 2, wherein any volatile non-aqueous constitutients in the colorant composition are present in an amount no greater than 500 ppm by weight, any alkylphenol ethoxylates and derivatives thereof are present in an amount greater than 100 ppm by weight, any crystalline silica is present in an amount no greater than 100 ppm by weight, and any formaldehyde is present in an amount no greater than 5 ppm by weight.

4. The aqueous latex paint or other water-borne coating of claim 3, wherein any volatile non-aqueous constituents in the colorant composition are present in an amount no greater than 300 ppm by weight, any alkylphenol ethoxylates and derivatives thereof are present in an amount no greater than 300 ppm by weight, any crystalline silica is present in an amount no greater than 5 ppm by weight, and any formaldehyde is present in an amount no greater than 5 ppm by weight.

5. The aqueous latex paint or other water-borne coating of claim 1, wherein said colorant composition is substantially entirely free of any volatile non-aqueous constituents, of any alkylphenol ethoxylates and derivatives thereof, of any crystalline silica and of any formaldehyde.

6. The aqueous latex paint or other water-borne coating of claim 1, wherein the colorant composition comprises at least one organic pigment, at least one inorganic pigment, or at least one organic pigment and at least one inorganic pigment.

7. A colorant composition suitable as a precursor to an aqueous latex paint or other water-borne coating, which colorant composition comprises at least one color pigment, water, and a copolymer surfactant, which colorant composition is not itself the aqueous latex paint or other water-borne coating, wherein the copolymer surfactant comprises moieties corresponding to the following monomers:
   (a) from about 10% to about 80% by weight of at least one $C_3$-$C_{12}$ α, β-ethylenically unsaturated carboxylic acid or anhydride,
   (b) from about 10% to about 80% by weight of at least one $C_2$-$C_{12}$ α, β-ethylenically unsaturated vinyl monomer, and
   (c) from about 0.01% to about 20% by weight of at least one surfactant monomer,
   wherein said surfactant monomer is either an acrylic or methacrylic ester moiety joined with a hydrophobic moiety by a bridging group comprising a poly(ethyleneoxy) moiety,
   wherein the copolymer surfactant is attached to the at least one color pigment to form a plurality of color pigment composite particles, and
   wherein the colorant composition further comprises at least one additional surfactant which is different from said copolymer surfactant.

8. A colorant composition suitable as a precursor to an aqueous latex paint or other water-borne coating, which colorant composition comprises at least one color pigment, water, and a copolymer surfactant, which colorant composition is not itself the aqueous latex paint or other water-borne coating, wherein the copolymer surfactant comprises moieties corresponding to the following monomers:

(a) from about 10% to about 80% by weight of at least one $C_3$-$C_{12}$ α, β-ethylenically unsaturated carboxylic acid or anhydride, (b) from about 10% to about 80% by weight of at least one $C_2$-$C_{12}$ α, β-ethylenically unsaturated vinyl monomer, and (c) from about 0.01% to about 20% by weight of at least one surfactant monomer, wherein said surfactant monomer is either an acrylic or methacrylic ester moiety joined with a hydrophobic moiety by a bridging group comprising a poly(ethyleneoxy) moiety, wherein the copolymer surfactant is attached to the at least one color pigment to form a plurality of color pigment composite particles, and wherein the colorant composition further comprises a water-soluble polymer selected from the group consisting of polycarboxylic acids, copolymers comprising a monomer containing a carboxylic acid, alkali soluble emulsion polymers, cellulose derivatives, salts of a polyacrylic acid, salts of a copolymer comprising a monomer containing an acrylic acid, polyvinylpyrrolidone, copolymers comprising a vinylpyrrolidone monomer, and two or more thereof.

9. A colorant composition suitable as a precursor to an aqueous latex paint or other water-borne coating, which colorant composition comprises at least one color pigment, water, and a copolymer surfactant, which colorant composition is not itself the aqueous latex paint or other water-borne coating, wherein the copolymer surfactant is attached to the at least one color pigment to form a plurality of color pigment composite particles, and wherein the copolymer surfactant comprises moieties corresponding to the following monomers:

(a) from about 10% to about 80% by weight of methacrylic or acrylic acid, (b) from about 10% to about 80% by weight of a first vinyl ester which, is alkyl methacrylate, the alkyl of which is of from 2 to 12 carbon atoms, and a second vinyl ester, wherein the second vinyl ester is selected from the group consisting of vinyl acetate, vinyl propionate, vinyl butyrate, vinyl isobutyrate, vinyl benzoate, vinyl m-chlorobenzoate, vinyl p-methoxybenzoate, and vinyl alpha-chloroacetate, (c) from about 0.01% to about 20% by weight of at least one surfactant monomer, wherein said surfactant monomer is either an acrylic or methacrylic ester moiety joined with a hydrophobic moiety, which is a styrylphenyl moiety, by a bridging group comprising a poly(ethyleneoxy)moiety.

10. A colorant composition suitable as a precursor to an aqueous latex paint or other water-borne coating, which colorant composition comprises at least one color pigment, water, and a copolymer surfactant, which colorant composition is not itself the aqueous latex paint or other water-borne coating, wherein the copolymer surfactant comprises moieties corresponding to the following monomers:

(a) from about 10% to about 80% by weight of at least one $C_3$-$C_{12}$ α, β-ethylenically unsaturated carboxylic acid or anhydride, (b) from about 10% to about 80% by weight of at least one $C_2$-$C_{12}$ α, β-ethylenically unsaturated vinyl monomer, and (c) from about 0.01% to about 20% by weight of at least one surfactant monomer, wherein said surfactant monomer is either an acrylic or methacrylic ester moiety joined with a hydrophobic moiety by a bridging group comprising a poly(ethyleneoxy) moiety, wherein the copolymer surfactant is attached to the at least one color pigment to form a plurality of color pigment composite particles, and wherein the hydrophobic moiety is selected from the group consisting of monostyrylphenyl, distyrylphenyl, tristyrylphenyl and a mixture thereof.

11. A colorant composition suitable as a precursor to an aqueous latex paint or other water-borne coating, which colorant composition comprises at least one color pigment, water, and a copolymer surfactant, which colorant composition is not itself the aqueous latex paint or other waterborne coating, wherein the copolymer surfactant comprises moieties corresponding to the following monomers;

(a) from about 10% to about 80% by weight of at least one $C_3$-$C_{12}$ α, β-ethylenically unsaturated carboxylic acid or anhydride, (b) from about 10% to about 80% by weight of at least one $C_2$-$C_{12}$ α, β-ethylenically unsaturated vinyl monomer, and (c) from about 0.01% to about 20% by weight of at least one surfactant monomer, wherein said surfactant monomer is either an acrylic or methacrylic ester moiety joined with a hydrophobic moiety by a bridging group comprising a poly(ethyleneoxy) moiety, wherein the copolymer surfactant is attached to the at least one color pigment to form a plurality of color pigment composite particles, and wherein the copolymer surfactant has a number average molecular weight of from about 400 Daltons to about 200,000 Daltons.

12. An aqueous latex paint or other water-borne coating comprising a tint base admixed with a colorant composition, wherein the colorant composition comprises at least one color pigment, water, and a copolymer surfactant, which colorant composition is not itself the aqueous latex paint or other water-borne coating, wherein the copolymer surfactant comprises moieties corresponding to the following monomers:

(a) from about 10% to about 80% by weight of at least one $C_3$-$C_{12}$ α, β-ethylenically unsaturated carboxylic acid or anhydride, (b) from about 10% to about 80% by weight of at least one $C_2$-$C_{12}$ α, β-ethylenically unsaturated vinyl monomer, and (c) from about 0.01% to about 20% by weight of at least one surfactant monomer, wherein said surfactant monomer is either an acrylic or methacrylic ester moiety joined with a hydrophobic moiety by a bridging group comprising a poly(ethyleneoxy) moiety, wherein the copolymer surfactant is attached to the at least one color pigment to form a plurality of color pigment composite particles, and wherein the Stormer low-shear viscosity of the aqueous latex paint or other water-borne coating is within about ±20% of the Stormer low-shear viscosity of the tint-base.

13. The aqueous latex paint or other water-borne coating of claim 12, wherein the Stormer low-shear viscosity of the aqueous latex paint or other water-borne coating is within about ±10% of the Stormer low-shear viscosity of the tint-base.

14. The aqueous latex paint or other water-borne coating of claim 1, wherein the hydrophobic moiety comprises a styrylphenyl moiety, an alkyl moiety or an alkylphenyl moiety.

15. The aqueous latex paint or other water-borne coating of claim 1, wherein the at least one color pigment comprises a color inorganic pigment.

16. The aqueous latex paint or other water-borne coating of claim 15, wherein the color inorganic pigment comprises at least one of carbon black, lampblack, black iron oxide, yellow iron oxide, brown iron oxide or red iron oxide.

17. The aqueous latex paint or other water-borne coating of claim 1, wherein the at least one color pigment comprises a color organic pigment.

18. The aqueous latex paint or other water-borne coating of claim 17, wherein the color organic pigment comprises at least one of phthalocyanine blue, phthalocyanine green, monoarylide yellow, diarylide yellow, benzimidazolone yellow, heterocyclic yellow, DAN orange, quinacridone magenta, quinacridone violet or organic red.

\* \* \* \* \*